US010924278B2

(12) United States Patent
McGough

(10) Patent No.: US 10,924,278 B2
(45) Date of Patent: Feb. 16, 2021

(54) METHOD AND APPARATUS FOR AUTHENTICATION AND ENCRYPTION SERVICE EMPLOYING UNBREAKABLE ENCRYPTION

(71) Applicant: Qwyit LLC, Oak Hill, VA (US)

(72) Inventor: R Paul McGough, Manassas, VA (US)

(73) Assignee: Qwyit, LLC, Oak Hill, VA (US)

( * ) Notice: Subject to any disclaimer, the term of this patent is extended or adjusted under 35 U.S.C. 154(b) by 0 days.

(21) Appl. No.: 16/035,123

(22) Filed: Jul. 13, 2018

(65) Prior Publication Data
US 2020/0322148 A1   Oct. 8, 2020

Related U.S. Application Data

(60) Provisional application No. 62/532,095, filed on Jul. 13, 2017.

(51) Int. Cl.
H04L 9/32 (2006.01)
H04L 9/08 (2006.01)
H04L 29/06 (2006.01)

(52) U.S. Cl.
CPC .............. H04L 9/321 (2013.01); H04L 9/083 (2013.01); H04L 9/0822 (2013.01);
(Continued)

(58) Field of Classification Search
CPC ....... H04L 9/321; H04L 9/083; H04L 63/168; H04L 9/0891; H04L 9/0894; H04L 9/0822; H04L 9/0861; H04L 9/08; H04L 9/32
See application file for complete search history.

(56) References Cited

U.S. PATENT DOCUMENTS 10,129,223 B1 * 11/2018 Bhattacharyya ...... H04L 63/061
2002/0067832 A1 * 6/2002 Jablon .................... H04L 9/085
380/277
(Continued)

OTHER PUBLICATIONS

"Qwyit LLC, The QwyitCash Protocol: Reference Guide, Jan. 2016, qwyit.com/page7.html, pp. 1-37" (Year: 2016).*
(Continued)

Primary Examiner — Oleg Korsak
Assistant Examiner — Nhan Huu Nguyen
(74) Attorney, Agent, or Firm — Michael P. Fortkort, Esq.; Michael P Fortkort PC

(57) ABSTRACT

Qwyit® Authentication and Encryption Service serves as a direct replacement of Transport Layer Security. Applications can place a small code segment within their communications protocol, resulting in authenticated and encrypted message traffic with the features of TLS while adding additional improvements as set forth herein. QAES provides a direct next generation replication and enhancement of the current, only global secure communications framework. QAES provides the same features, benefits, authentication (embedded) and data security (stream cipher) for communications traffic using the Qwyit® Directory Service key store. The combination of features and properties provide a simple, straightforward way for any application to incorporate secure communications. The unique, superior Qwyit® protocol delivers where TLS fails: embedded security without any need for additional bandwidth, processing power or cumbersome user requirements. QAES shows Qwyit® can provide secure communications within the network tolerances for insecure communications. QAES easily allows any client/server or cloud-based application to add TLS-like authentication and encryption. The present invention includes a Qwyit® Directory Server application that can be run on, or added to, any current communications server (web, file, comms, app, DB, (Continued)

etc.), as well as client code for easy insertion into the communications protocol/processing of a connected device/app.

20 Claims, 8 Drawing Sheets

(52) U.S. Cl.
CPC .......... *H04L 9/0861* (2013.01); *H04L 9/0891* (2013.01); *H04L 9/0894* (2013.01); *H04L 63/168* (2013.01)

(56) References Cited

U.S. PATENT DOCUMENTS

| | | | | |
|---|---|---|---|---|
| 2003/0147536 | A1* | 8/2003 | Andivahis | H04L 9/083 380/277 |
| 2004/0110488 | A1* | 6/2004 | Komsi | H04W 12/1206 455/411 |
| 2007/0180236 | A1* | 8/2007 | Kuroyanagi | H04L 63/0428 713/162 |
| 2007/0192584 | A1* | 8/2007 | Bajar | H04W 12/0013 713/150 |
| 2008/0056501 | A1* | 3/2008 | McGough | H04L 9/0825 380/281 |
| 2008/0065886 | A1* | 3/2008 | McGough | H04L 63/061 713/168 |
| 2008/0165972 | A1* | 7/2008 | Worthington | H04L 51/00 380/278 |
| 2008/0184031 | A1* | 7/2008 | McGough | H04L 63/08 713/171 |
| 2008/0285756 | A1* | 11/2008 | Chuprov | H04L 9/0838 380/277 |
| 2009/0086973 | A1* | 4/2009 | Buddhikot | H04W 12/0609 380/273 |
| 2010/0201536 | A1* | 8/2010 | Robertson | G07C 9/00904 340/686.6 |
| 2012/0204032 | A1* | 8/2012 | Wilkins | H04L 63/0428 713/170 |
| 2012/0260087 | A1* | 10/2012 | McGough | H04L 9/3271 713/155 |
| 2013/0227286 | A1* | 8/2013 | Brisson | H04L 9/3226 713/168 |
| 2016/0241389 | A1* | 8/2016 | Le Saint | H04L 9/14 |
| 2016/0269372 | A1* | 9/2016 | Pizano | H04L 63/061 |
| 2017/0012949 | A1* | 1/2017 | Boren | H04L 63/062 |
| 2017/0244687 | A1* | 8/2017 | Moulds | G06F 7/00 |
| 2017/0289197 | A1* | 10/2017 | Mandyam | H04L 63/06 |
| 2018/0241728 | A1* | 8/2018 | Burgess | H04L 9/0861 |
| 2018/0242875 | A1* | 8/2018 | Volpe | A61B 5/0006 |

OTHER PUBLICATIONS

"Crescenzo, G., and Veach, G., RPM: Lightweight Communication Security from Additive Stream Ciphers, 2015, NIST, pp. 1-8" (Year: 2015).*

* cited by examiner

METHOD AND APPARATUS FOR AUTHENTICATION AND ENCRYPTION SERVICE EMPLOYING UNBREAKABLE ENCRYPTION

PRIORITY CLAIM

This application claims priority to U.S. Provisional Patent Application No. 62/532,095 filed Jul. 13, 2017 entitled "Method and Apparatus for Authentication and Encryption Service."

RELATED APPLICATIONS

The present application is related to the following patents and patent applications:

U.S. patent application Ser. No. 08/879,708 filed Jun. 20, 1997 (now U.S. Pat. No. 6,058,189, which issued May 2, 2000) entitled "Method and System for Performing Secure Electronic Monetary Transactions;"

U.S. patent application Ser. No. 08/923,095 filed Sep. 4, 1997 (now U.S. Pat. No. 6,002,769, which issued Dec. 14, 1999) entitled "Method and System for Performing Secure Electronic Messaging," which claimed the benefit of U.S. patent application Ser. No. 08/879,708;

U.S. patent application Ser. No. 09/212,294 filed Dec. 16, 1998 (now U.S. Pat. No. 6,445,797, which issued Sep. 3, 2002) entitled "Method and System for Performing Secure Electronic Digital Streaming;"

U.S. patent application Ser. No. 10/062,312 filed Feb. 1, 2002 entitled "Method and System for Performing Perfectly Secure Key Exchange and Authenticated Messaging;"

U.S. Provisional Application No. 60/563,065 filed Apr. 16, 2004;

U.S. patent application Ser. No. 11/108,347 filed Apr. 18, 2005 entitled "Method and System for Performing Perfectly Secure Key Exchange and Authenticated Messaging," which claimed the benefit of U.S. patent application Ser. No. 10/062,312 and U.S. Provisional Application No. 60/563,065;

U.S. Provisional Application No. 60/842,595 filed Sep. 6, 2006;

U.S. patent application Ser. No. 11/850,948 filed Sep. 6, 2007 (now U.S. Pat. No. 7,899,185, which issued Mar. 1, 2011) entitled "Real privacy management authentication system," which application claimed the benefit of U.S. Provisional Application No. 60/842,595;

U.S. patent application Ser. No. 11/899,741 filed Sep. 6, 2007 (now U.S. Pat. No. 8,144,874), which issued Mar. 27, 2012 and is entitled "Method for Obtaining Key for use in Secure Communications over a Network and Apparatus for Providing Same," which application claimed the benefit of U.S. Provisional Application No. 60/842,595;

U.S. patent application Ser. No. 11/899,742 filed Sep. 6, 2007 (now U.S. Pat. No. 8,144,875), which issued Mar. 27, 2012 and is entitled "Method and System for Establishing Real-Time Authenticated and Secured Communications Channels in a Public Network," which application claimed the benefit of U.S. Provisional Application No. 60/842,595;

U.S. patent application Ser. No. 13/430,253 filed Mar. 26, 2012 (now U.S. Pat. No. 8,649,520), which issued Feb. 11, 2014 and is entitled "Method and System for Real-Time Trust in a Public Network," which application in turn claimed priority to U.S. patent application Ser. No. 11/899,742;

U.S. patent application Ser. No. 14/176,284 filed Feb. 10, 2014, (now U.S. Pat. No. 9,374,347 which issued Jun. 21, 2016) entitled "Method and System for Establishing Real-Time Trust in a Public Network" which claimed priority to U.S. patent application Ser. No. 13/430,253;

U.S. patent application Ser. No. 15/188,275 filed Jun. 21, 2016, entitled "Method and System for Authentication Over a Public Network Using Multiple Out-Of-Band Communications Channels to Send Keys" which claimed priority to U.S. patent application Ser. No. 14/176,284.

U.S. Provisional Patent Application No. 62/532,095 filed Jul. 13, 2017 entitled "Method and Apparatus for Authentication and Encryption Service."

U.S. Provisional Patent Application No. 62/639,737 filed Mar. 7, 2018 entitled "Method and Apparatus for Credit Transaction Employing Unbreakable Encryption."

U.S. Provisional Patent Application No. 62/660,535 filed Apr. 20, 2018 entitled "Storage and Access Control Service Using Unbreakable Encryption."

U.S. Provisional Application No. 62/279,329 filed Jan. 15, 2016.

All of the foregoing patents and patent applications are hereby incorporated by reference, including the drawings, as if repeated herein in their entirety.

BACKGROUND

The present invention relates generally to methods and apparatuses for performing authentication and encryption in electronic data communications, and more particularly to a method and apparatus for performing authentication and encryption in electronic data communications while providing perfect forward secrecy.

In order for cryptography to look forward to a better future, it is helpful to learn from the past. The single most important development since 1917, when the 'only' perfectly secure encryption was created (i.e., Gilbert Vernam's One Time Pad cipher), was the 1970's Public Key system. See, The Code Book, by Simon Singh, Doubleday, 1999; pp. 279-80.

The story starts in the late 1960s, when the British military began to worry about the problem of key distribution. Looking ahead to the 1970s, senior military officials imagined a scenario in which miniaturization of radios and a reduction in cost meant that every soldier could be in continual radio contact with his officer. The advantages of widespread communication would be enormous, but communications would have to be encrypted, and the problem of distributing keys would be insurmountable. This was an era when the only form of cryptography was symmetric, so an individual key would have to be securely transported to every member of the communications network. Any expansion in communications would eventually be choked by the burden of key distribution. At the beginning of 1969, the military asked James Ellis, one of Britain's foremost government cryptographers, to look into ways of coping with the key-distribution problem.

The envisioned 'insurmountable key distribution problems with secret key systems' led to the development of these Public Key Infrastructures (PKIs), and the only current global secure communications protocol based on them, Internet communication using Transport Layer Security (TLS). TLS is a 20-year effort based on the fundamentally sound, but 'environmentally challenged' PKI methodology. 'Environmentally challenged': "The extra latency and computational costs of the full TLS handshake impose a serious performance penalty on all applications that require secure communication." See, TLS, Networking 101, Chapter 4.

There are several other issues with TLS, most of which are 'solved' with a patchwork of upgrades, extensions, expert control, additional hardware, but unfortunately introduce more cost, complexity, inflexibility, incomprehensibility, increased bandwidth, and even decreased security when attempting to 'solve' the other problems. In short, TLS has reached the full extent of its capabilities, leaving its one global secure communication application lacking, and never even reaching any others: Internet of Things, autonomous vehicle control, multi-cast entertainment, etc.

The problem still remains: Global, cross-application, multi-platform, simple key distribution and management for use in provably secure, private, authentic communication.

Since there has been one successful model (TLS), why not replicate, extend and enhance it in order to meet and deliver the system properties that will solve Mr. Ellis' still-remaining problem of widespread secure communication: Performance (Speed); Simplicity (user and implementation); Flexibility (trust, platforms, application); Efficiency (size and bandwidth); and Security (privacy, authentication, provable basis).

The present invention is therefore directed to the problem of developing a method and system for authentication and encryption that works within TLS's proven business and technology model, but which concomitantly:

Performs within the network tolerances without degradation, without new processing power;
Is easily placed into existing code bases, hardware chips, communication protocols;
Does not require the end-user to 'do stuff they don't understand';
Expands, contracts, segregates and includes different trust models, across multiple platforms and protocols, can be integrated the same way in different applications;
Is small enough in code, firmware and hardware not to impede or limit anything already accomplished;
Uses the same provable basis of security as last century's leap forward: mathematics, not computation, or theoretic; and
Provides Perfect Forward Secrecy (PFS) along with authentication, encryption, integrity and replay prevention; and
Accomplishes the above goals while employing unbreakable encryption.

SUMMARY OF THE INVENTION

The present invention solves these and other problems by providing a security service called the Qwyit® Authentication and Encryption Service (QAES) or Qwyit® Talk, which serves as a direct replacement of Transport Layer Security (TLS). Applications can place a small code segment of the present invention within their communications protocol, resulting in authenticated and encrypted message traffic with all of the current features of TLS while adding additional improvements as set forth herein, including unbreakable encryption.

The present invention termed the Qwyit® Authentication and Encryption Service (QAES) provides a direct next generation replication and enhancement of the current, only global secure communications framework: Transport Layer Security (TLS). QAES provides the same features, benefits, authentication (embedded) and data security (stream cipher) for communications traffic using the Qwyit® Directory Service key store.

The inventions herein provide direct improvements to the functioning of computers and computer systems by reducing the complexity required for authentication and encryption while simultaneously employing mathematically provable unbreakable encryption. Moreover, the inventions herein provide these improvements to the functioning of computers and computer systems while increasing the speed at which this unbreakable encryption performs, thereby improving the speed of such computers and computer systems. The small size and lightweight software code required to implement the inventions herein enable use of authentication and encryption in places heretofore not possible, such as small Internet of Things (IoT) devices. The flexibility of the inventions herein provides customizable applications and key size selections to accommodate system requirements not possible with existing encryption systems. Keys can be updated with NIL communication (i.e., without requiring any communication between or among the users) during use such that only the two users can ever know what keys were being used on which messages. Different keys can be used for each packet in a packetized communication system without any degradation in processing time. Hardware implementations can be designed such that the encryption and authentication protocols herein can be performed in the same time the message propagates through the chip. All of these performance improvements and capabilities to computers and computer systems are made possible by the inventions herein.

According to one aspect of the present invention, a method for transmitting encryption keys to users who are communicating between each other in an encrypted manner using unbreakable encryption includes several steps. A verified setup request is sent from a first client to a directory server during an https session, wherein said verified setup request includes at least an email address for the first client and a short message service (SMS) telephone number via which the first client can receive a text message. A first set of encryption credential for the first client is generated, by the directory server upon receipt of the verified setup request from the first client, wherein said first set of encryption credentials includes a first open identification (OpenID), a first master key (MQK), a first email offset key (EOK), and a first SMS offset key (SOK). The directory server performs a position digit algebraic function (PDAF) with the first EOK and the first SOK by cycling through each round of the first SOK moving a starting digit right one digit for each cycle to generate a first master offset key (MOK). The directory server also performs the PDAF with the first MQK and the first MOK to generate a first master exchange key (MEK). The directory server stores the first MQK and the first MEK in relation with the first client's email address, first client's SMS telephone number, first OpenID and a first IP address via which the first client initially contacted the directory server. The directory server also encrypts the first EOK and the first SOK using the first MQK to generate a first encrypted email offset key (EOKe) and a first encrypted SMS offset key (SOKe), respectively. The directory server sends a verified setup reply to the first client during the https session, wherein said verified setup reply includes the first OpenID, and the first MQK. The directory server sends an email reply to the first client to the email address provided by the first client, wherein said email reply includes the first OpenID and the first EOKe. The directory server also sends an SMS text message reply to the first client to the SMS telephone number provided by the first client, wherein said SMS text message reply includes the first OpenID and the first SOKe. The first client decrypts the first EOKe and the first SOKe using the first MQK to generate the first email offset key (EOK) and the first SMS offset key (SOK), respectively. The first client performs the PDAF with the first EOK and the first SOK by cycling through each round of the first SOK moving a starting position right one digit for each cycle to generate the first MOK. The first client performs the PDAF with the first MQK and the first MOK to generate the first MEK. The first client concatenates the first MQK and the first MEK to form a first directory service key (DSK). Thus, the first client has obtained the DSK for subsequent communications from the Directory server.

According to another aspect of the present invention, a next embodiment comprises a method for confirming receipt of the DSK with the directory server. This exemplary method includes several steps, which may or may not require the same steps in the previous embodiment. The first client generates a first open return, which is a random number. The first client performs a modular addition of the first open return and the first MEK to generate a first return (R). The first client performs a combine function using the first MQK and the first R to generate a first alphabet (A). The first client performs an extract function using the first MQK and the first A resulting in the first message key (W). The first client generates a first confirmation salt (CS) by performing the PDAF with part of the first MQK and an equal part of the first MEK. The first client encrypts the first CS using the first W to generate a first encrypted confirmation salt (CSe). The first client sends a confirmation message to the directory server, which confirmation message includes the first OpenID, the first open return, and the first CSe.

According to yet another aspect of the present invention, a next embodiment comprises a method for verifying that the first client has received the correct DSK by the directory server. This exemplary method includes several steps, which may or may not require the same steps in the previous embodiments. The directory server performs a modular addition of the first open return and the first MEK to generate the first R. The directory server performs the combine function using the first MQK and the first R to generate the first A. The directory server performs the extract function using the first MQK and the first A resulting in the first W. The directory server decrypts the first CSe using the first W to obtain a first decrypted confirmation salt. The directory server generates a first generated confirmation salt by performing the PDAF with said part of the first MQK and said equal part of the first MEK. The directory server compares the first decrypted confirmation salt with the first generated confirmation salt.

According to yet another aspect of the present invention, a next embodiment comprises a method for performing an authentication handshake by the first client with the directory server to obtain a session start key for communication with a second client. This exemplary method includes several steps, which may or may not require the same steps in the previous embodiments. The first client generates a first message identification (MID), which is a random number. The first client generates a first authentication request open return, which is a random number. The first client sends an authorization request to the directory server to receive a session start key (SSK) for communication with a second client, which authorization request includes the first OpenID, the first authentication request open return, and an authentication request cipher text, which authentication request cipher text includes the first OpenID, a second OpenID for the second client, and the MID encrypted with a Qwyit Cipher using the first DSK. As used herein, the Qwyit Cipher refers to the method set forth in FIG. 5 to encrypt or decrypt as the case may be.

According to yet another aspect of the present invention, a next embodiment comprises a method for responding to the request by the first client to obtain a session start key for communication with a second client. This exemplary method includes several steps, which may or may not require the same steps in the previous embodiments. The directory server decrypts with the Qwyit Cipher the first OpenID, the second OpenID, and the MID using the first DSK and the first authentication request open return. The directory server verifies that the first OpenID in the authentication request matches the decrypted version of the first OpenID. The directory server creates the SSK. The directory server may then store the SSK in relation with the first OpenID, the second OpenID and the MID.

According to yet another aspect of the present invention, a next embodiment comprises a method for sending the response to the request by the first client to obtain a session start key for communication with a second client. This exemplary method includes several steps, which may or may not require the same steps in the previous embodiments. The directory server generates a first SSK accept message open return. The directory server sends to the first client a first SSK accept message, which includes the first SSK accept message open return, and a first SSK accept message cipher text, which first SSK accept message cipher text includes the SSK, the first OpenID and the second OpenID encrypted in the Qwyit Cipher using the first DSK and the first SSK accept message open return. The directory server generates a second SSK accept message open return. The directory server sends to the second client a second SSK accept message, which includes the second SSK accept message open return, and a second SSK accept message cipher text, which second SSK accept message cipher text includes the SSK, the first OpenID and the second OpenID encrypted in the Qwyit Cipher using the first DSK and the second SSK accept message open return.

According to yet another aspect of the present invention, a next embodiment comprises a method for processing the response from the directory server to the request by the first client to obtain a session start key for communication with a second client. This exemplary method includes several steps, which may or may not require the same steps in the previous embodiments. The first client decrypts with the Qwyit Cipher the first SSK accept message cipher using the first DSK and the first SSK accept message open return to obtain the SSK and stores the SSK.

According to yet another aspect of the present invention, a next embodiment comprises a method for processing by the second client the response from the directory server to the request by the first client to obtain a session start key for communication with a second client. This exemplary method includes several steps, which may or may not require the same steps in the previous embodiments. The second client decrypts with the Qwyit Cipher the second SSK accept message cipher using the second DSK and the second SSK accept message open return to obtain the SSK and stores the SSK.

According to yet another aspect of the present invention, a next embodiment comprises a method for performing a NIL communication key update by the first client and the directory server. This exemplary method includes several steps, which may or may not require the same steps in the previous embodiments. The first client performs a NIL communication DSK update by performing a PDAF on the first MQK and the first MEK for two rounds creating an updated first MQK and an updated first MEK. The directory server performs a NIL communication DSK update by performing a PDAF on the first MQK and the first MEK for two rounds creating the updated first MQK and the updated first MEK.

According to yet another aspect of the present invention, a next embodiment comprises a method for performing a NIL communication key update by the second client and the directory server. This exemplary method includes several steps, which may or may not require the same steps in the previous embodiments. The second client performs a NIL communication DSK update by performing a PDAF on the second MQK and the second MEK for two rounds creating an updated second MQK and an updated second MEK. The directory server performs a NIL communication DSK update by performing a PDAF on the second MQK and the second MEK for two rounds creating the updated second MQK and the updated second MEK.

According to yet another aspect of the present invention, a next embodiment comprises a method for performing a NIL communication key update by the first client and the directory server. This exemplary method includes several steps, which may or may not require the same steps in the previous embodiments. The first client performs a NIL communication DSK update by performing a PDAF on the first MQK and the first MEK for four rounds creating a first double length MQK and a first double length MEK. The first client performs a one-way-cut of each of the first double length MQK and the first double length MEK to form a first updated MQK and a first updated MEK. The directory server performs a NIL communication DSK update by performing a PDAF on the first MQK and the first MEK for four rounds creating the first double length MQK and the first double length MEK. The directory server performs a one-way-cut of each of the first double length MQK and the first double length MEK to form the first updated MQK and the first updated MEK.

According to yet another aspect of the present invention, a next embodiment comprises a method for performing a NIL communication key update by the second client and the directory server. This exemplary method includes several steps, which may or may not require the same steps in the previous embodiments. The second client performs a NIL communication DSK update by performing a PDAF on the second MQK and the second MEK for four rounds creating a second double length MQK and a second double length MEK. The second client performs a one-way-cut of each of the second double length MQK and the second double length MEK to form a second updated MQK and a second updated MEK. The directory server performs a NIL communication DSK update by performing a PDAF on the second MQK and the second MEK for four rounds creating the second double length MQK and the second double length MEK. The directory server performs a one-way-cut of each of the second double length MQK and the second double length MEK to form the second updated MQK and the second updated MEK.

According to yet another aspect of the present invention, a next embodiment comprises another method for sending the response to the request by the first client to obtain a session start key for communication with a second client. This exemplary method includes several steps, which may or may not require the same steps in the previous embodiments. The directory server generates a first SSK accept message open return. The directory server sends to the first client a first SSK accept message, which includes first OpenID, the first SSK accept message open return, a first SSK accept message cipher text, and a second SSK accept message cipher text, which first SSK accept message cipher text includes the SSK encrypted in the Qwyit Cipher using the first DSK and the first SSK accept message open return, and which second SSK accept message cipher text includes the SSK doubly encrypted in the Qwyit Cipher using the second DSK and the first SSK accept message open return.

According to yet another aspect of the present invention, a next embodiment comprises a method for processing the response from the directory server to the request by the first client to obtain a session start key for communication with a second client. This exemplary method includes several steps, which may or may not require the same steps in the previous embodiments. The first client decrypts by the first client the first SSK accept message cipher text with the Qwyit Cipher using the first DSK and the first SSK accept message open return to obtain the SSK. The first client generates a first qwyit open return. The first client performs a mod16 operation on the SSK and the first qwyit open return to obtain a session master key (SMK). The first client generates a second qwyit open return. The first client sends to the second client a Start Message, which includes the first SSK accept message open return, the second SSK accept message cipher text, the first OpenID, the first qwyit return, the second qwyit return, and an initial message cipher text, which is an initial message plain text that has been encrypted with the Qwyit Cipher using the SMK and the second qwyit open return.

According to yet another aspect of the present invention, a next embodiment comprises a method for processing the initial message from the first client by the second client. This exemplary method includes several steps, which may or may not require the same steps in the previous embodiments. The second client doubly decrypts the second SSK accept message cipher text with the Qwyit Cipher using the first SSK accept message open return and the second DSK to derive the SSK. The second client derives the SMK from the derived SSK by performing the mod16 operation on the SSK and the first qwyit open return. The second client decrypts the initial message cipher text with the Qwyit Cipher using the SMK and the second qwyit open return to obtain the initial message plain text.

According to yet another aspect of the present invention, a next embodiment comprises a method for performing an authentication handshake by the first client with the directory server to obtain a session start key for communication with a plurality of second clients. This exemplary method includes several steps, which may or may not require the same steps in the previous embodiments. The first client generates a first authentication request open return, which is a random number. The first client generates a first confirmation salt (CS) by performing the PDAF with part of the first MQK and an equal part of the first MEK. The first client encrypts the first CS with a Qwyit Cipher using the first authentication request open return and the first DSK to generate a first encrypted confirmation salt (CSe). The first client sends an authorization request to the directory server to receive a session start key (SSK) for communication with a plurality of second clients, which authorization request includes the first OpenID, a plurality of second OpenIDs, the first authentication request open return, and an authentication request cipher text, which authentication request cipher text includes the CSe.

According to yet another aspect of the present invention, a next embodiment comprises a method for responding to the request by the first client of the directory server to obtain a session start key for communication with a plurality of second clients. This exemplary method includes several steps, which may or may not require the same steps in the previous embodiments. The directory server decrypts with the Qwyit Cipher the CSe using the first DSK and the first authentication request open return. The directory server verifies that the first OpenID in the authentication request matches the decrypted version of the first OpenID. The directory server creates the SSK. The directory server stores the SSK in relation with the first OpenID and the plurality of second OpenIDs. The directory server generates a first SSK accept message open return. The directory server sends to the first client a first SSK accept message, which includes the first SSK accept message open return, and a first SSK accept message cipher text, which first SSK accept message cipher text includes the SSK encrypted in the Qwyit Cipher using the first DSK and the first SSK accept message open return. The directory server sends to each of the plurality of second clients a second SSK accept message, which includes the first SSK accept message open return, and a second SSK accept message cipher text, which second SSK accept message cipher text includes the SSK encrypted in the Qwyit Cipher using each second client's DSK and the first SSK accept message open return. The first client decrypts with the Qwyit Cipher the first SSK accept message cipher using the first DSK and the first SSK accept message open return to obtain the SSK. The first client stores the SSK. Each of the second client decrypts with the Qwyit Cipher the second SSK accept message cipher using each of the second client's DSK and the first SSK accept message open return to obtain the SSK. Each of the second client stores the SSK. The first client generates a first qwyit open return. The first client performs a mod16 operation on the SSK and the first qwyit open return to obtain a session master key (SMK). The first client generates a second qwyit open return. The first client sends to the each of the second clients a Start Message, which includes the first OpenID, the first qwyit return, the second qwyit return, and an initial message cipher text, which is an initial message plain text that has been encrypted with the Qwyit Cipher using the SMK and the second qwyit open return. Each of the second clients derives the SMK from the SSK by performing the mod16 operation on the SSK and the first qwyit open return. Each of the second clients decrypts the initial message cipher text with the Qwyit Cipher using the SMK and the second qwyit open return to obtain the initial message plain text.

Each of the aforementioned methods may be performed by a processor in accordance with instructions stored on a non-transitory computer readable media.

DETAILED DESCRIPTION

Introduction

Figure 1:
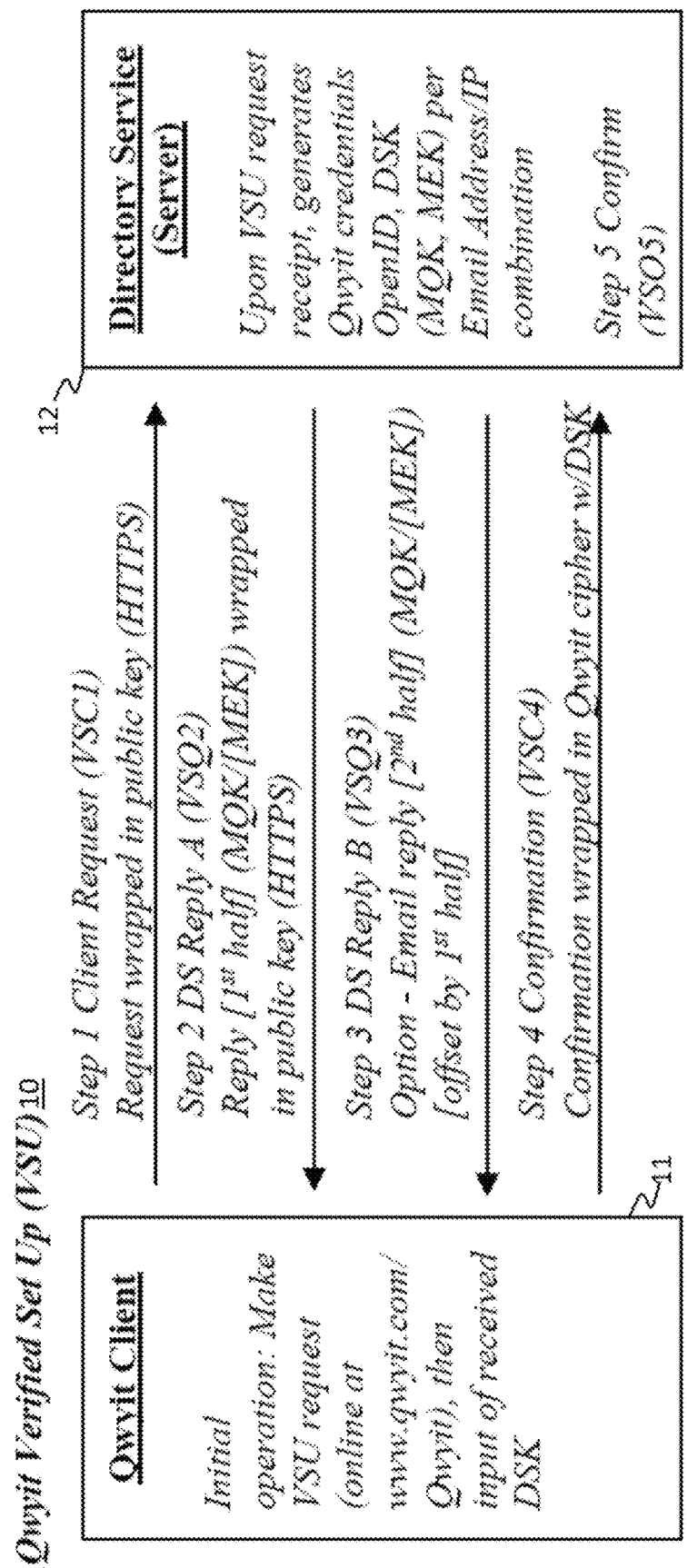
FIG. 1 depicts an exemplary embodiment of a verified setup of the present invention using two bands according to one aspect of the present invention.

QAES demonstrates of the power and flexibility of the Qwyit® authentication and data security protocol. The combination of features and properties provide a simple, straightforward way for any application to incorporate secure communications. QAES is a real-world example of the performance, small size, flexible trust, simple development, easy execution and improved security of Qwyit®- and it follows the exact TLS technology model. The unique, superior Qwyit® protocol delivers where TLS fails: embedded security without any need for additional bandwidth, processing power or cumbersome user requirements. QAES shows Qwyit® can provide secure communications within the network tolerances for insecure communications.

QwyitTalk™ Authentication and Encryption Service (QwyitTalk™, QT™) is a direct next generation replication and enhancement of the current, only global secure communications framework: Transport Layer Security (TLS). Qwyit provides the same features, benefits, authentication (embedded) and data security (stream cipher) for communications traffic using the Qwyit Directory Service (QDS) key store. QwyitTalk™ is an implementation capability based on the full Qwyit protocol described herein.

Approach

QAES easily allows any client/server or cloud-based application to add TLS-like authentication and encryption. The present invention includes a Qwyit® Directory Server application that can be run on, or added to, any current communications server (web, file, comms, app, DB, etc.), as well as client code for easy insertion into the communications protocol/processing of a connected device/app.

QAES Components

At the core of the inventions herein are two main components. A server and a client application that interacts with the server. The QAES Server can be any web server, file server or the like (or a combination of multiple servers providing a common web service). The client application comprises a QAES-compatible client application, i.e., a client with QAES SDK embedded capability. Examples of client applications include text messaging applications (mobile and PC based), telephone applications (both VoIP and cellular based), IoT device applications, banking and financial transaction applications, military applications, server-server applications, client-client applications, or the like. Notably, the present invention makes heretofore possible encrypted cellular telephone applications that operate over the cellular network due to the extremely small overhead required. Other applications will be apparent based on the following description.

QAES Core Required Processes

The following are the core required QAES processes (mirroring TLS):

Initial Authentication Token/Credential Distribution (Verified Setup—VSU)

The Initial QAES client authentication token distribution is accomplished through a Verified Setup (VSU) with the QAES Directory Server (DS). In the examples herein, the token being distributed is a 512-bit 2-part key along with a public identifier: OpenID [up to 64-bits], MQK [Master Qwyit® Key, 256-bits], MEK [Master Exchange Key, 256-bits]). The exact key lengths can be modified based on the application, so this 512-bit key is merely an example. Both longer and shorter keys can be employed without departing from the spirit of the present invention. Even variable key lengths could be used within four bit increments if desired.

This token distribution and client authentication is similar to certificate obtainment and installation in TLS. The main enhancement is that all QAES participants will perform a VSU. In TLS, only servers install certificates, as the clients almost universally do not. Not only does this universally authenticate all participants, it removes the end-user confusion/required 'expert-ism' of multi-layered, multi-point Username/Password complexity. Thus, the present invention serves to improve the performance of computers and computer-based systems by authenticating all users, including clients and not just servers while reducing unnecessary complexity required by existing authentication and encryption systems and protocols.

FIG. 1 depicts the Verified Setup 10 for QAES in which client 11 performs VSU 10 with Directory service or server 12. While FIG. 1 depicts a two-band key distribution method, this is the minimum recommended electronic key distribution method. Depending on the security requirements of the system, one may use more or less bands, although less is not recommended. TLS only uses a single band wrapped in a public key. The present invention recommends a minimum of two bands, as shown above. One can imagine using three bands (e.g., by adding SMS texting), or using 4 bands (e.g., by adding a phone call), or even using five bands (e.g., by adding a paper delivery (or two!)) all sending either MQK/MEK portions or simple PDAF or OWC offsets. The general concept remains the same for all implementations of multiple bands. Parts of the MQK/MEK are sent over each band and PDAF or OWC offsets are used to form the actual MQK/MEK.

Figure 2:
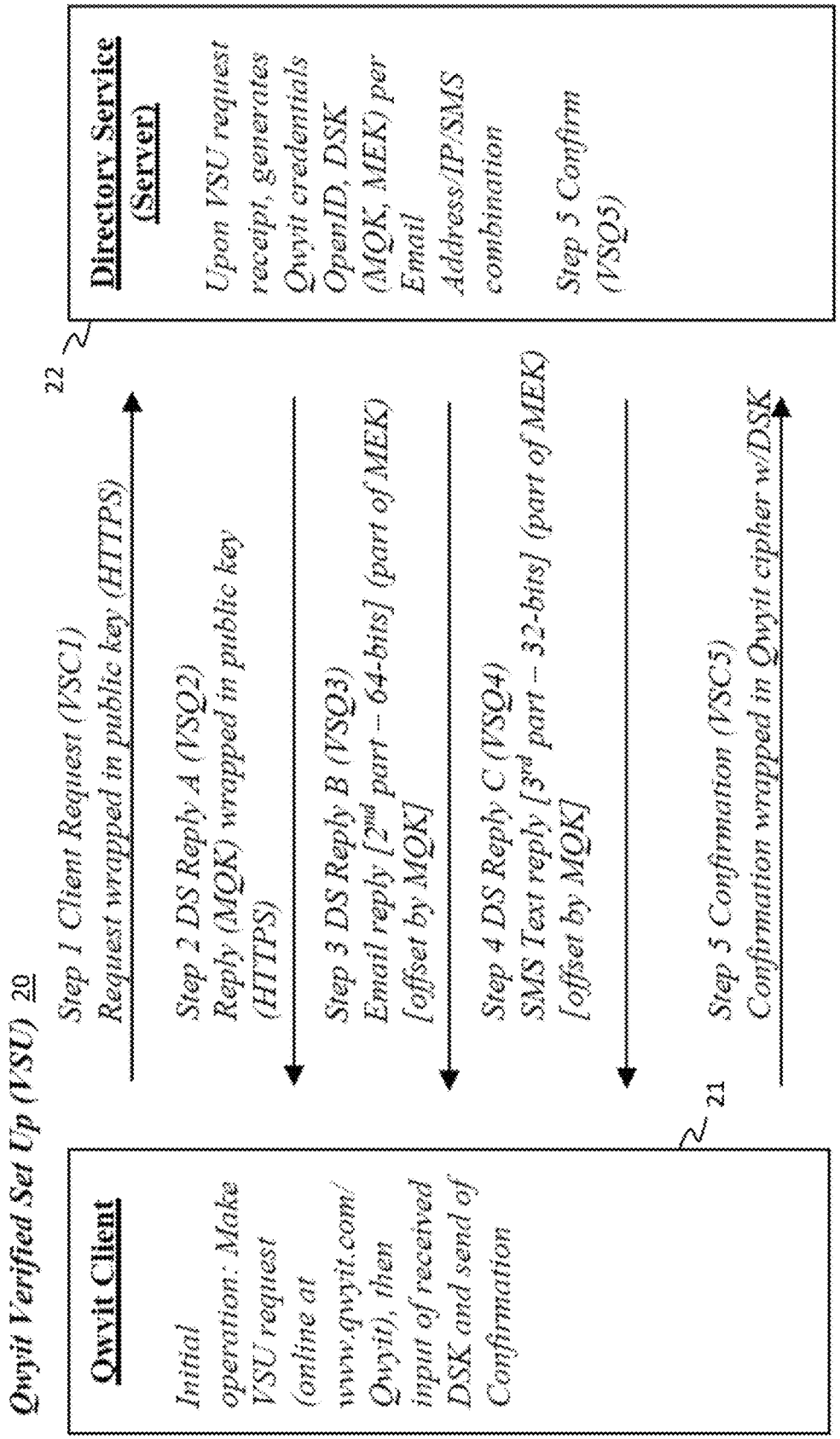
FIG. 2 depicts an exemplary embodiment of a verified setup of the present invention using three bands according to another aspect of the present invention.

The Qwyit Verified Setup (VSU) 20 outlined in FIG. 2 is a three-band implementation. The security of these different implementations can either be reliant on an initial HTTPS/TLS distribution (using Qwyit® primitive offsets (PDAF/OWC/MOD16) in the other bands as shown below) or increasing the security by implementing actions within those bands (e.g., calling/texting for offsets, etc.). QAES may use the TCP/UDP IANA reserved port for HTTPX, port number 4180 in a web architecture. Thus, after the initial communication with the directory server during the HTTPS session, the client can switch to port 4180 to listen to the reply from the directory server.

Following each step description below, if there is a message sent, the format is shown in brackets:
[MessageTitleID: parameter1, parameter2, . . . ended with a QAES termination character (^)].

QAES is a direct replacement of TLS: The VSU is Certificate obtainment and installation, the AH is the TLS handshake for session key creation and agreement, and Qwyit® Talk is the chosen cipher. The AH and Qwyit® Talk Cipher are orders of magnitude faster (less round trips, less computation), yet provide Perfect Forward Secrecy (PFS), authentication and encryption. QAES also replaces all of the TLS extensions, while simultaneously providing more benefits, orders of magnitude simpler and faster operation (e.g., ALPN, SNI, etc.) as well as all of the Public Key Certificate Authority and certificate 'handling' (Revocation, OCSP, etc.).

Perfect Forward Secrecy (PFS) can be implemented in several ways, and at various process points: all with the benefit of not adding any process interruption, degradation, computational inefficiency. This is done without ANY communication (called NIL communication), in which both parties update simultaneously after any single key use by performing a Position-Digit-Algebraic-Function (PDAF) to a new agreed, authentic value without sending any messages. Each participant pair (QT™/Client, Client/Client) performs a PDAF with the master keys (MQK and MEK) after an Authenticated Handshake (AH), at QT session end (updating SQK, SEK), etc. at the designated interval; which can be static, or known-random (i.e., from a selection of the uniquely embedded key content—this would be client-app configured). The PDAF has been shown to retain the initial random entropy of the key halves for at least $10^7$ iterations. Should a meaningful security limit be found, Qwyit® Talk implementation would then recommend new key VSU deliveries at safe intervals. PFS key updates shown below. If desired, add a One-Way-Cut (OWC).

The following outlines the step for each part of the inventive method.

Verified Setup (VSU) (20, FIG. 2)

1. Client 21 initiates VSU 20 within the application (and as required/desired) with the Directory Service/Server 22 (FIG. 2: Step 1, VSC1).
   a. Client 21 goes to www.Qwyit.com/Qwyit (for example) where an HTTPS session will begin, and enters the required information.
   b. This generates a VSU 20 start on the client application and the Directory Server 22 (FIG. 2: VSC1).
   c. Client 21 app now awaits receipt and entry of the key.
2. Directory Service/Server 22 reply to client 21 (FIG. 2: Steps 2, 3, and 4—VSQ2, VSQ3, VSQ4).
   a. The client 21 has submitted a VSU 20 on the webpage and is waiting for the reply.
   b. Server 22 generates OpenID (recommend 16-digit, 64-bit unique IDs), DSK for client.
      (1) Server 22 generates a random, unique 16-hex digit, 64-bit OpenID for this client 21 (per email/SMS/IP (if));
      (2) Server 22 generates random 352-bits that includes three (3) parts: (i) Master Qwyit Key (MQK, 64 hex digits, 256-bits); (ii) Email Offset Key (EOK, 16 hex digits, 64-bits); and (iii) SMS Offset Key (SOK, 8 hex digits, 32-bits).
      (3) Perform a PDAF (EOK, SOK) generating 8 rounds (cycling through each round of SOK moving the start 1 digit to the right).
         (i) Result is the Master Offset Key (MOK, 64 hex digits, 256-bits).
      (4) Perform a PDAF (MQK, MOK) generating 1 round;
         (i) Result is the Master Exchange Key (MEK, second 64 hex digits, 256-bits)—store with MQK as this new client's Qwyit® keys.
      (5) Encrypt EOK and SOK using MQK
         (i) Concatenate EOK and SOK.
         (ii) MOD16 add the first 96-bits (24 hex digits) of MQK with the concatenated EOK and SOK.
         (iii) Separate the encrypted EOKe and SOKe and ready to send in email and SMS respectively.
      (6) Reply (VSQ2) with OpenID, (MQK) during the HTTPS session on the webpage [VSQ2: OpenID, MQK].
      (7) Reply Step 3 to email address, sending OpenID and EOKe [VSQ3: OpenID, EOKe in email].

(8) Reply Step 4 to SMS number, sending OpenID and SOKe [VSQ4: OpenID, SOKe in SMS].

Client 21 Decrypt of Reply and Confirmation (Step 5, VSC5)

Figure 5:
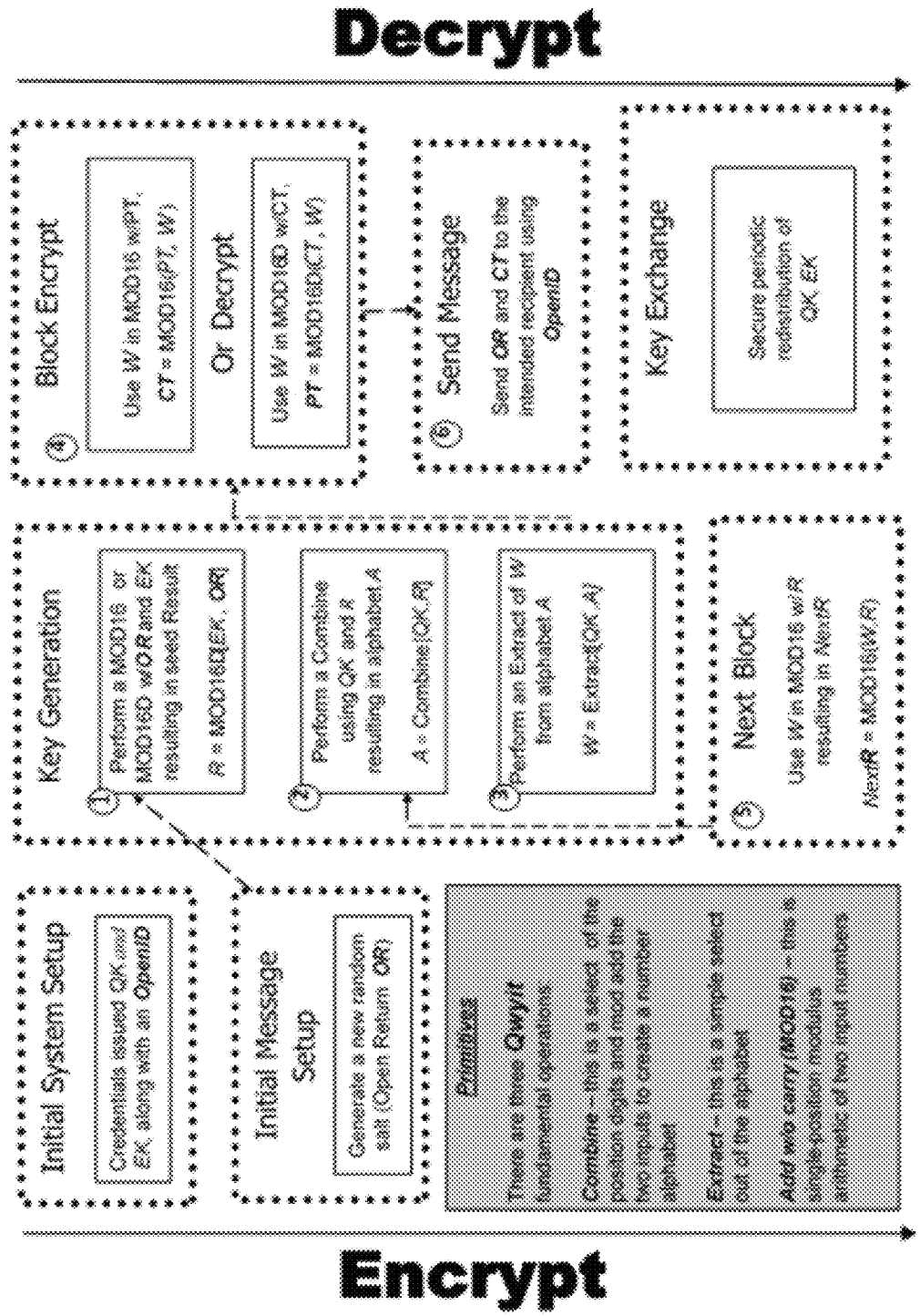
FIG. 5 depicts an exemplary embodiment of a Qwyit® stream cipher and key exchange/update of the present invention according to yet another aspect of the present invention.

1. Client 21 will cut & paste the session-shown OpenID, EOKe and SOKe into their application, and OpenID and MQK will appear in the app/window, as the HTTPS session has received those.
   a. Open email message to reveal OpenID and EOKe; cut & paste (or type) into application (both values).
   b. Open SMS text message to reveal OpenID and SOKe; cut and paste (or type) into application (both values).
2. Click button to "Store Key" (or some relevant, pertinent UI text).
   a. Applet 21 will check that all 3 OpenIDs match
   b. Applet 21 will decrypt EOKe and SOKe, and create MEK
      (1) Concatenate EOKe and SOKe.
      (2) MOD16 add the first 96-bits (24 hex digits) of MQK with the concatenated EOKe and SOKe.
         (i) Separate the decrypted EOK and SOK and ready for use to create MEK.
   c. Perform a PDAF (EOK, SOK) generating 8 rounds (cycling through each round of SOK moving the start 1 digit to the right).
      (i) Result is the Master Offset Key (MOK, 64 hex digits, 256-bits
   d. Perform a PDAF (MQK, MOK) generating 1 round.
      (i) Result is the Master Exchange Key (MEK, second 64 hex digits, 256-bits)—store with MQK as this new client's Qwyit® keys.
   e. Concatenate MQK and MEK making complete 512-bit DSK.
   f. Insert into use (e.g., store DSK, OpenID in cookie, file, database)
3. Reply by client 21 (FIG. 2: VSC5) to DS 22 with Confirmation message.
   a. Perform Qwyit® cipher using DSK (MQK and MEK), generating message key (W). Refer to FIG. 5 for the Qwyit stream cipher details.
   b. Use message key to encrypt confirmation message, which is a 128-bit, 64 hex digit ID salt created by using the last 64 digits (128-bits) of the MQK in a PDAF with the last 64 digits (128-bits) of the MEK.
      (1) Perform a PDAF (MQK 128-bits, MEK last 128-bits); result is Confirmation Salt.
      (2) Perform Qwyit® encrypt using W and CS, result is CS encrypted (CSe).
   c. Send (FIG. 2: VSC5) output (OpenID, OR, CSe) to DS [VSC5: OpenID, OR, CSe].

DS 22 Decrypt of Confirmation Message (Step 5, VSQ5)

1. Perform Qwyit® cipher using the DSK (found by sent OpenID) and reveal the message key (W).
   a. Use message key to decrypt confirmation salt (by creating the correct same ID salt and comparing).
      (1) Perform a PDAF (MQK 128-bits, MEK last 128-bits); result is Confirmation Salt generated.
      (2) Perform Qwyit® decrypt using W and CSe, result is CS received decrypted (CS).
      (3) Compare CS received decrypted with CS generated: (i) If doesn't match, error sent; or (ii) If match confirmed, store IP Address, OpenID, DSK, email address, SMS (and whatever other required session ID was collected) into DS 22 database.

Per Message Token/Credential Distribution (Authentication Handshake—AH)

Figure 3A:
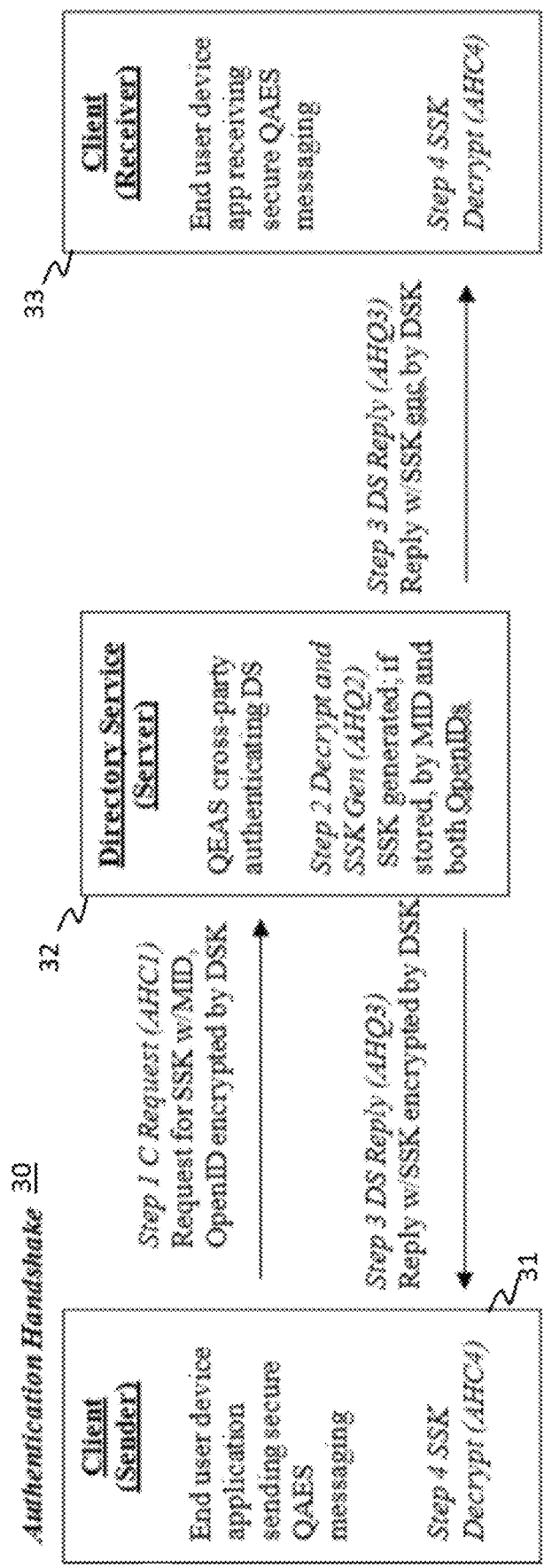
FIGS. 3A and 3B depict different exemplary embodiments of an authenticated handshake of the present invention according to still another aspect of the present invention.

Referring to FIG. 3A, for each participant-pair messaging session, the sender 31 will initiate a private real-time Authentication Handshake (AH) 30 with a shared QAES Directory Server 32 in order to create a QAES VPN tunnel with the intended receiver 33 (based on their OpenID). The token is a session-based 512-bit Session Start Key (SSK). Participant-pair will generate their own Session Master Key (SMK) from the SSK in 2-parts: SQK [Session Qwyit® Key, 64 hex digits, 256-bits], SEK [Session Exchange Key, 64 hex digits, 256-bits]).

Figure 3B:
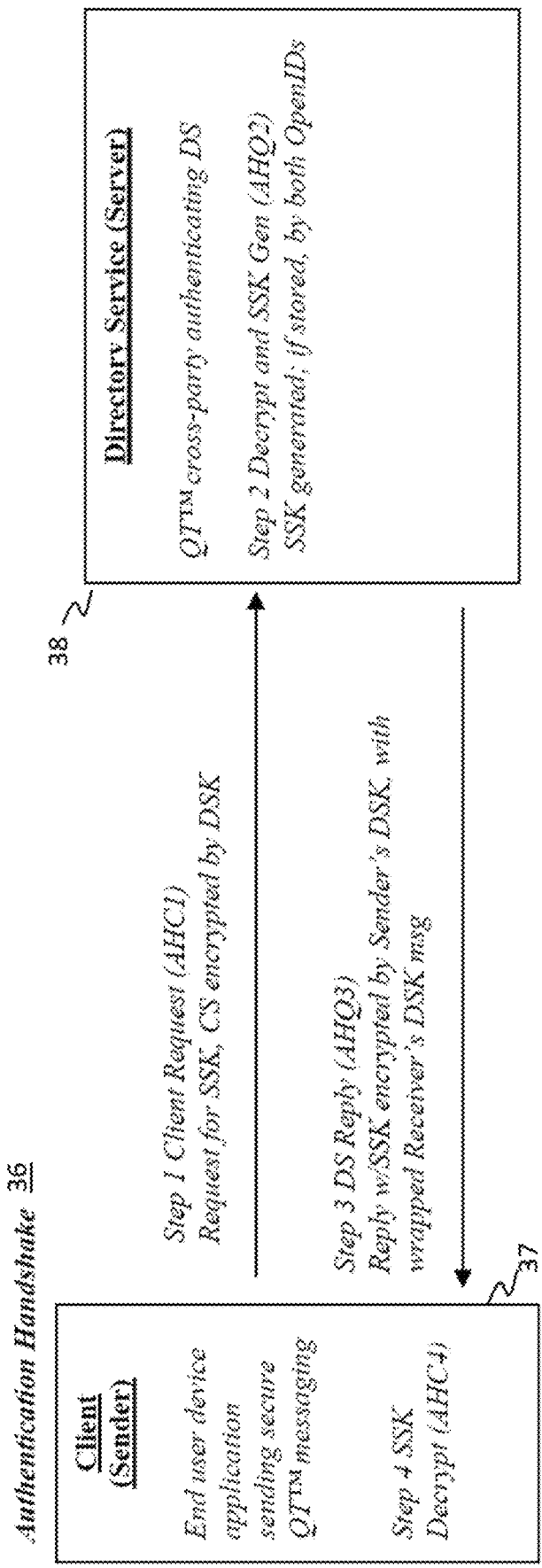

This is identical to the TLS handshake. The main enhancement is that QAES requires only a single Round Trip. The RT is with the QAES server 32, not the destination 31 or 33, so security is enhanced. The initial contact with the destination 33 is 100% authentic and encrypted. FIG. 3A shows one exemplary embodiment, in which the session keys are transmitted to both parties (Sender 31 and Receiver 33) simultaneously, whereas FIG. 3B shows an alternative embodiment 36 in which the session keys are transmitted from the directory server 38 to the Sender 37 for both the Sender 37 and the Receiver (not shown), and are then transmitted from the Sender 37 to the Receiver as part of the first message.

As in FIG. 3A, QAES can be configured so that the destination 33 receives the session keys at the same time as the initiating client 31 so that initial 100% authentic and encrypted reply is instantaneous as both parties 'prepare' before even communicating. 'Prepare' is an almost instantaneous Qwyit® cipher encrypt, not the Rube Goldberg TLS PKI processing. Because of this enhanced speed/timing, there is no need for any extensions for session resumptions, etc. And no trade-off for security, complexity, etc. FIG. 3A shows the Authenticated Handshake 30.

The QAES AH 30 includes a paired unique P2P SSK for that client pair (initiating 31 and their destination 33). In FIG. 3B, in this P2P, the SSK is only sent to the initiating client 37 who can decrypt their portion, but not their destination's portion. 'Prepare' is an almost instantaneous Qwyit™ Cipher encrypt, not the complex TLS PKI processing. Because of this enhanced speed/timing, there is no need for any extensions for session resumptions, etc. And no trade-off for security, complexity, etc.

The AH SSK is unique to each messaging pair of participants: after delivery, the DS 32 destroys it. Should there be a requirement to retain SSKs, the QDS will need to be set to do so (by MID). Since the SSK is not the actual SMK used to encrypt the session/message, if the requirement arises to understand private conversations, after requiring the DS 32 to store the SSK, the entire message stream could be captured and read (requirement to outside agency).

Authentication Handshake (AH)—Exemplary Embodiment 1 (30, FIG. 3A)

1. Client Sender 31 sends Authorization Request to Directory Service/Server 32 (FIG. 3A: Step 1, AHC1).
   a. Create MessageID (MID, 64 hex digits, 256-bits) using (P)RNG.
   b. Send Authorization Request (AUTR) to DS 32 in order to receive an SSK for communication with intended Client 33.
      (1) Send AHC1: SenderOpenID, ReceiverOpenID and MID encrypted in Qwyit® Cipher using DSK to DS 32.
      [FIG. 3: AHC1: SenderOpenID, OR, CT].

2. Directory Service/Server 32 generates SSK (FIG. 3A: Step 2, AHQ2).
   a. Decrypt AHC1 from Client 31 using respective OpenID and DSK in Qwyit® Cipher.
      (1) Check that Client 31 who is requesting is the same as encrypted request and Receiver client 33 exists.
   b. Create Session Start Key (SSK, 128 hex digits, 512-bits).
   c. If to be stored, by MID and SenderOpenID, ReceiverOpenID.
3. Directory Service/Server 32 reply to Clients 31, 33 (FIG. 3A: Step 3, AHQ3).
   a. Send SSK Accept (AHQ3) to Sender 31 and Receiver Clients 33.
      (1) Send AHQ3: SenderOpenID, ReceiverOpenID, SSK encrypted in Qwyit® Cipher using DSK to Clients 31, 33.
      (2) The AHQ3 is sent to both sending 31 and receiving Clients 33, and DS 32 is authentic if using the correct DSK.
         (i) If Receiver Client 33 does not exist in DS 32: (A) If this DS 32 is part of a federated group, check with other DS members as per the Qwyit® Talk communication key exchange framework of the group; (B) Else send join invitation (clickable link, email, etc.), then send AHQ3 if client joins; and (C) Notify Sending Client 31 of situation (if desired/required—no client, if client joins, etc.).
[AHQ3: OpenID, OR, CT] where OpenID is the Senders 31 and the Receivers 33 in their respective messages, and CT is the ciphertext of the other OpenID, SSK.
4. Clients 31, 33 decrypt SSK (FIG. 3A: Step 4, AHC4).
   a. Both Sender 31 and Receiver Clients 33 decrypt AHQ3 from DS using DSK in Qwyit® Cipher.
   b. Clients 31, 33 only reply to DS 32 if unable to decrypt key (for whatever reason), sending an AHE for error.
   c. Clients 31, 33 commence Qwyit® Talk messaging with Sender initiating contact with Qwyit® Start message in Normal Operation.
5. Directory Service/Server 32 and each Client 31, 33 perform a PDAF PFS NIL communication (i.e., an update without communicating between each other) DSK key update.
   a. Perform a PDAF (MQK 256-bits, MEK 256-bits) for two rounds, creating 512-bit result with MQK, MEK halves.
      (1) Optionally, extend the above PDAF for 2 rounds (doubling length) and perform an OWC.

Authentication Handshake (AH)—Exemplary Embodiment 2 (36, FIG. 3B)

Client Sender 37 sends Authorization Request to Directory Service/Server 38 (Step 1, AHC1), FIG. 3B.

Send Authorization Request (AUTR) to DS 38 in order to receive an SSK for communication with intended Client (not shown).

Create Confirmation Salt (64 hex digits, 256-bits). The Confirmation Salt (CS) can be any system defined CS as per the Sender/Receiver IDs 'marketplace' (app, industry, etc.). Such as: Using the 1st two digits of the OR (rounded up, even) as the length of bits to pull from the MQK (front/back determined by the 3rd digit of the OR in sum with the 3rd digit of the MEK), used in a PDAF upon itself)—or any creation/summation that fits the performance requirements, as well as somewhat non-static (even though this isn't necessary—the same CS can be used repeatedly, as it is uniquely encrypted).

Send AHC1: SenderOpenID, ReceiverOpenID, CS encrypted in The Qwyit Cipher using DSK to DS 38.

[AHC1: SenderOpenID, ReceiverOpenID, OR, CT] where CT is the encrypted CS.

NOTE: While ReceiverOpenID may be considered 'private' (you may not want anyone to know who you are going to contact; although in TLS this is fundamentally known); digitally, it is impossible to 'hide' your next connection, so it will be known. It is certainly possible to include the ReceiverOpenID in the encrypted CT; but it leaks information about the message keys, unless twice-encrypted—and all of that work is for naught. No one has the SSK but you and your intended recipient, so your communications will be secure.

Directory Service/Server 38 Generates SSK (Step 2, AHQ2), FIG. 3B.

Decrypt AHC1 from Client 37 using respective OpenID and DSK in the Qwyit Cipher. Check that Sender client 37 has submitted a correct, meaningful CS (integrity, authentication). Message integrity is inherent within the encrypted CS—no other needed. Check that Receiver client exists.

Create Session Start Key (SSK, 128 hex digits, 512-bits). If to be stored, store by SenderOpenID, ReceiverOpenID.

Directory Service/Server 38 reply to Client Sender 37 (Step 3, AHQ3), FIG. 3B.

Send SSK Accept (AHQ3) to Sender, with wrapped Receiver Clients' message. The AHQ3 is sent to the Sending Client 37 only in this embodiment, not the Receiver Client, as in the Embodiment in FIG. 3A.

If Receiver Client does not exist in DS 38:
   If this DS 38 is part of a federated group, check w/other DS members as per the communication key exchange framework of the group.
   Notify Sending Client 37 of situation (if desired/required—no Receiver client).

The AHQ3 includes two different Cipher Texts. The SSK is encrypted using the Sender Client's DSK and the OR. The SSK is twice-encrypted using the Receiver Client's DSK and the same OR. As per the Qwyit Cipher, a second message key is created and used again on the first encryption's Cipher Text (this is to obscure the Message Key chain from the Sender who is aware of the Plain Text and could derive the first message key).

[AHQ3: OpenID, OR, CT1, CT2] where OpenID is the Sender Clients, CT1 is the SSK-encrypted ciphertext using the Sender's DSK and CT2 is the twice-encrypted SSK ciphertext using the Receiver's DSK.

NOTE: The integrity of the return message is such that any deviation in either cipher text will be detected by either client in their inability to communicate (as their SSKs won't match)—or if amazingly, a bit is flipped in both CTs such that the SSK is changed 'correctly' for both participants—great! An outsider has no knowledge to meaningfully do this and gains nothing.

Sender Client 37 Decrypts SSK (Step 4, AHC4), FIG. 3B.

Sender Client 37 decrypts AHQ3 from DS 38 using DSK in the Qwyit Cipher. Client only replies to DS 38 if unable to decrypt key (for whatever reason), sending an AHE for error.

Sender 37 and Receiver Clients commence QwyitTalk messaging with Sender 37 initiating contact with QwyitTalk™ Start message (including OR, CT2 for Receiver to derive SSK) in Normal Operation.

Directory Service/Server 38 and Sender Client 37 perform a PDAF PFS NIL communication DSK key update.

Perform a PDAF (MQK 256-bits, MEK 256-bits) for two rounds, creating 512-bit result with MQK, MEK halves. Optionally, extend the above PDAF for 2 rounds (doubling length) and perform an OWC. NOTE: Keeping the keys in synch between the QDS 38 and the Client 37 needs careful attention. Each different Qwyit-Talk™ network may require unique handling.

Messaging—Qwyit® Talk

Figure 4:
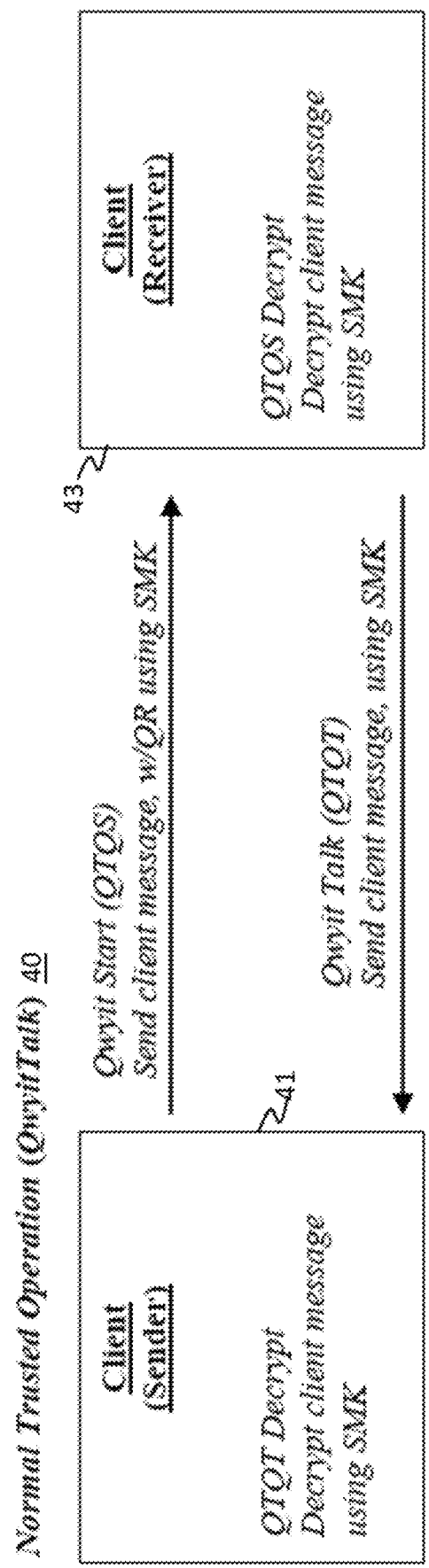
FIG. 4 depicts an exemplary embodiment of a normal trusted operation of the present invention according to yet another aspect of the present invention.

Referring to FIG. 4, Normal Trusted Operation 40, each participant 41, 43 using the SMK in secure Qwyit® Cipher exchanges—this is Qwyit® Talk between the two clients, 41, 43 securely using their own generated session keys. This is identical to the TLS session key creation, cipher selection and initial secure use. The main enhancement is that QAES uses only Qwyit® Talk—the world's fastest and most secure cipher (by an order of magnitude). (The SMK (SQK, SEK) must be handled and stored securely, only for this particular session).

Normal Trusted Operation (40, FIG. 4)—for Use with Embodiment 1 in FIG. 3A

1. Sending Client 41 sends Qwyit® Start to Client Receiver 43 (Qwyit® Start, QTQS).
    a. Sending Client 41 generates a Qwyit® Return (QR, 128 hex digits, 512-bits).
    b. Using the AH SSK from the DS for this communication:
        (1) Perform MOD16(SSK, QR); result is the Session Master Key (SMK, in 2 halves, SQK and SEK).
        (2) Create new message content (IMSG, the Initial Message opening communication).
        (3) Perform Normal Trusted Operation using Qwyit® Cipher on IMSG with SMK (SQK and SEK).
    c. Send Qwyit® Start (QTQS) message.
        (1) Send QTQS: OpenID, QR, OR, Ciphertext of IMSG
    [QTQS: OpenID, QR, OR, CT]
2. Receiving Client 43 decrypts QTQS (Qwyit® Talk, QTQT).
    a. Receiver Client 43, using the AH SSK received from the DS for this communication:
        (1) Determines SMK from the QS message by performing the same MOD16 (SSK, QR).
    b. Commences Normal Trusted Operation message receive decryption using SMK in Qwyit® Cipher on OR, Ciphertext.
3. Clients 41, 43 continue communication by performing Normal Trusted Operation messaging with Qwyit Cipher using SMK (Qwyit® Talk, QTQT Encrypt/Decrypt).
    a. Send Qwyit® Talk (QTQT) using SMK (SQK, SEK) in Qwyit® Cipher on message contents in secure communications.
    [QTQT: OpenID, OR, CT] where CT is the Ciphertext of message contents.
    b. QTQT Decrypt w/SMK (SQK, SEK) in Qwyit® Cipher to reveal secure message contents.
        (1) Receive and decrypt QTQT in Qwyit® Cipher using OR, to reveal Plaintext message contents.
4. At known, system defined end of SMK key life reached (# of messages, time, etc.), both Clients 41, 43 perform a PDAF PFS NIL communication SMK key update.
    a. Perform a PDAF (SQK 256-bits, SEK 256-bits) for two rounds, creating 512-bit SMK result w/SQK, SEK halves.
    b. Optionally, extend the above PDAF for 2 rounds (doubling length) and perform an OWC.

Normal Trusted Operation 40—for Use with Embodiment 2 in FIG. 3B

Sending Client 41 sends QwyitTalk™ Start to Client Receiver 43 (QwyitTalk™ Start, QTQS).

Sending Client 41 generates a QT™ Return (QR, 128 hex digits, 512-bits). Using the AH SSK from the DS for this communication:

Perform MOD16(SSK, QR); result is the Session Master Key (SMK, in 2 halves, SQK and SEK).

Create new message content (IMSG, the Initial Message opening communication).

Perform Normal Trusted Operation using The Qwyit Cipher on IMSG with SMK (SQK and SEK).

Send QwyitTalk™ Start (QTQS) message.

Send QTQS: OpenID, QR, OR1, OR2, CT2, Ciphertext of IMSG, where OR2 is the AHQ3 OR, and CT2 is the twice encrypted SSK.

[QTQS: OpenID, QR, OR1, OR2, CT2, CT].

Receiving Client 43 decrypts QTQS (QT™ Talk, QTQS).

Receiver Client 43, decrypts in two steps:
    1st decryption: using OR2 and their DSK to derive the SSK—this requires two Message Key decryptions as noted in the AH above. Now both clients have a shared SSK for this session.
    2nd decryption: using the just-derived AH SSK to determine the SMK from the QS message by performing the same MOD16(SSK, QR).

Commences Normal Trusted Operation using SMK in The Qwyit Cipher decryption of OR1, CT of IMSG.

Clients 41, 43 continue communication by performing Normal Trusted Operation messaging with Qwyit Cipher using SMK (QwyitTalk, QTQT Encrypt/Decrypt). Send QT™ Qwyit Talk (QTQT) using SMK (SQK, SEK) in The Qwyit Cipher on message.

[QTQT: OpenID, OR, CT] where CT is the Ciphertext of message contents.

QTQT Decrypt with SMK (SQK, SEK) in The Qwyit Cipher to reveal secure message contents. Receive and decrypt QTQT in The Qwyit Cipher using OR, to reveal Plaintext message contents.

At known, system defined end of SMK key life reached (# of messages, time, etc.), both Clients 41, 43 perform a PDAF PFS NIL communication SMK key update. Perform a PDAF (SQK 256-bits, SEK 256-bits) for two rounds, creating 512-bit SMK result w/SQK, SEK halves. Optionally, extend the above PDAF for 2 rounds (doubling length) and perform a One Way Cut.

Error Messaging (DSE)

Accompany all of the above w/appropriate error trapping and notifications

[DSE: MessageID, appropriate contents].

QAES Optional Processes

The following are optional system-defined QAES processes:

Client Application Key Storage (CKS)

Should there be a requirement/desire to tie the local version of the VSU received DSK to the individual user, as opposed to just the device (or if want a simple, effective encrypted storage technique in addition to the many already available to the client application through the OS, etc.), it is recommended that an n-digit hex PIN (security based on the number of digits) be used to encrypt DSK local storage with simple MOD 16 addition, accompanied by limiting the number of wrong use attempts locally, after notification from the DS of incorrect key use.

FIG. 5 shows the Qwyit Cipher 50 encrypt decrypt functionality.

SEND

Generate random salt Open Return [OR 256-bits]).

(This step does not require an 'unbreakable' or 'secure' (P)RNG process since the value is public; but it should meet the base requirements for uniqueness and randomness since it is the Qwyit® basis)

1. Perform MOD16 using EK and OR, resulting in R [256-bits].
2. Perform COMBINE using QK and R, resulting in alphabet A [256-bits].
3. Perform EXTRACT using QK and A, resulting in message key W [256-bits].
4. Perform MOD16 with W and up to 256-bits of the Plaintext (PT), resulting in Ciphertext (CT).
   a. For performance, with key and PT identical lengths, this may be an XOR of W and PT resulting in CT.
5. Perform MOD16 using W and R, resulting in the NextR [256-bits].

Perform 1 (using NextR as OR), 2, 3, 4 and 5 iteratively until the end of Plaintext (256-bits at a time), concatenating total C (There is no need to pad the plaintext).

Optionally (continual/random/regular), update EK (and/or QK) in MOD16's with last R or W.

Any 'update series' (with flag values, error checking and confirmations) is system-specific.

6. Send OpenID, OR and C to Recipient.

Receive

1. Perform MOD16 using EK and OR, resulting in R [256-bits].
2. Perform COMBINE using QK and R, resulting in alphabet A [256-bits].
3. Perform EXTRACT using QK and A, resulting in message key W [256-bits].
4. Perform MOD16D using 256-bits of Ciphertext (C) and W, resulting in Plaintext (P) [or CT XOR W=PT].
5. Perform MOD16 using W and R, resulting in the NextR [256-bits].

Perform 1 (using NextR as OR), 2, 3, 4 and 5 iteratively until the end of Ciphertext (256-bits at a time), concatenating total P.

Optionally (continual/random/regular), update EK (and/or QK) in MOD16's with last R or W.

The Qwyit® Protocol

The Qwyit® Protocol 50 provides authentication (embedded) and data security (stream cipher) for use in digital communications. "Qwyit®" refers to all parts of this version of the protocol, including the low-level functions. The complete protocol includes authentication key management through the Qwyit® Directory Server system.

Overview

Qwyit® provides authentication and data security at either the session level, or individual transaction level of any communications network. The Qwyit® method uses a symmetric key exchange for authentication and data security. It is a one-pass embedded authentication method, based on underdetermined equation sets. Qwyit® provides fast performance, small size, flexible trust, simple execution and improved security.

Approach

Qwyit® provides low-level foundation functions based on two simple principles:

Modular arithmetic

Digit position manipulations

These two simple principles, applied in unique configurations, provide the necessary protection for exchanging numeric key information and encrypting communications. They also provide the defining features that differentiate Qwyit® from the other systems: speed and size. Qwyit® performs step transformations of numeric key values into underdetermined numeric key results by pointing into values using other values and extracting the results which are then combined in simple modular fashion to generate transmittable values. The recipient then uses these transmission values to perform the same pointing, extraction and combinations to arrive at the implied transfer values. The resulting values are both the authentication credentials and the data security keys used for encrypting message data. Qwyit® then provides a simple stream cipher with key chaining for data security (encryption and decryption).

By building a system flow of the Qwyit® low-level functions, one can quickly and simply insert security—authentication and data encryption—into any communications system. The following is the reference Qwyit® key management architecture and stream cipher.

Qwyit® Low-level Functions

MOD16 and MOD16D

This pair of functions takes two input values and performs a modular add without carry of each digit position within the hexadecimal values.

One Way Cut (OWC)

This function uses modular add without carry to combine the adjacent digits (or other digit pairing combinations) to provide a one-way gate for irreversibly obtaining a new value from an old one.

Position Digit Algebra Function (PDAF)

This is a wide ranging, flexible function for taking one or two values and uniquely pointing a value into itself or one value into the other to obtain both position and value sub-results that are then modularly combined. The function is specifically capable of 'moving through' the inputs in a unique position/value manner such that a random unending result stream can be obtained (as measured by entity checking means). Using the PDAF provides a definitive, non-repudiated, one-way gate that can be easily configured within a function combination to provide wide-ranging underdetermined security with fast execution.

Combine and Extract

Using the same basic PDAF construct, this function pair creates a new key value 'alphabet' by selecting digit-position defined values and modularly adding them, and extracts a new key from that alphabet by selecting digit-position defined values from the add without carry result.

Combining these low-level functions in a variety of ways allows an almost infinite number of secure communications systems to be built, dependent on requirements and assumptions.

Qwyit® Assumptions

The following are required and/or recommended for a Qwyit® implementation:

1. Every participant must have the ability to operate the minimal Qwyit® functionality. Each participant must have Qwyit® resident on their device, be able to operate a served version of Qwyit® or operate a received version of Qwyit® within an application.
2. Ability to store the Qwyit® credentials (keys). A system-wide risk-to-value assessment should be performed to determine the desired storage technique(s). For example, the credentials can be PIN, or password hashed, kept locally or on a token (USB, RFID, etc.), etc.
3. A Qwyit® Directory Server (QDS) trust model (singular, multiple) with either a centralized or de-centralized (or combination) Key Distribution Center (KDC—the key management portion of a QDS). Participants must have a Security Association with a QDS through a Verified Setup (VSU) and for every Qwyit® messaging session (system defined—transaction level, session level, system level, etc.), they will perform an Authentication Handshake (AH), be granted shared message keys and perform messaging exchange using the Qwyit® Cipher (Qwyit® Talk) [See Qwyit® Talk and QDS Operation section].

4. Recommended: a best-of-breed random number generator (NIST approved); if not available locally, risk/reward entropy analysis should be performed, and appropriate provision provided.

QwyitTalk and QDS Operation

Qwyit works in a Federated Trust model, in both a Public and/or Private trusted network system(s). Qwyit will operate a Common Qwyit Directory Service (CQDS) having two distinct functions:
  Operation as a single, global individual QDS and associated KDC for any network access (e.g., A publicly accessible private QDS); and
  Operation as the repository of trusted Private global interconnectivity, showing public record of any and all Private QDS's desiring interconnected, federated trust (e.g., a Public KDC of Private QDS's that have performed VSU's and desire global trusted interconnectivity).

In establishing a Qwyit secure network, any operator can perform any or all of the following:
  Embed QwyitTalk in their products and operate their own Private QDS
  Embed QwyitTalk and operate their own Private QDS that is VSU connected to the CQDS
  Embed QwyitTalk and connect to the CQDS
  Build QwyitTalk and connect to another operator's QDS (Private and/or Public)

Scenario 1 establishes a private Qwyit network that cannot connect to 'the outside world', but very well may be interconnected with other operator-trusted networks (corporate, etc.).

Scenario's 2 and 3 will both have global trusted Qwyit connectivity; the advantage of Scenario 2 being that their Private QDS may be connected to additional/inter- and/or intra-networks that the operator desires to not be globally connected (enterprise, mobile, etc.)—the operator can easily manage this trust through their QDS whereas in Scenario 3, Qwyit would not perform such 'housekeeping' (Trust in the Qwyit CQDS is across all members).

Scenario 4 might be preferred for industry-specific QDS operation (utilities, etc.) where such QDS's can be both Private (customer relation to their electric company) and/or Industry-Public (specific geographic region of inter-connected utilities such as the Northwest, etc.) where the operators collectively run their PubQDS (a Public QDS operating for their domain and member's Private QDS as the CQDS does globally).

The Qwyit protocol processes will enable any and all Federated Trust connectivity of CQDS/QDS.

Security and Claims

There are several layers of study for a protocol as flexible as Qwyit, from cryptographic through business process application, where each has their own terminology, characteristics, etc. Qwyit will leave it to the analyst to investigate any particular assumption(s) and property(ies) set. The general slogan for Qwyit is that it performs mutual, continuous authentication and data security. This defining statement means:

Mutual: both participants share the same secret, and exchange information mathematically based on it in both directions;
  Continuous: every Qwyit configuration presents unique information in every exchange;
  Authentication: Qwyit exchanges establish both parties as genuine; and
  Data Security: Qwyit provides irreversible, one-way function protection of upper level credentials; and creates unique keys used by either a best-of-breed cipher (such as AES) or the Qwyit primitives-based stream cipher, on every communication.

Qwyit Design

Qwyit is the result of research into new methods for exchanging information securely. As there is a great deal of both theoretical and practical knowledge that purports to 'solve' most of the cryptographic needs of secure data exchange, Qwyit has concentrated on making real-world, real-time enhancements. Qwyit has several features that result in distinction in the marketplace that are a direct result of its purposeful design. Qwyit provides authentication and data security based on the required real-time characteristics:
  Limited system components
  User-friendly participation
  Simple installation and operation
  Fast communications performance
  Long lifecycle
  High ROI
  Flexible application and functionality
  Small code space
  High Security (protection versus risk)

Qwyit meets these criteria and does so by configuring uniquely designed cryptographic and engineering primitives.

Qwyit Security Basis

Qwyit creates consistent (having at least one solution), underdetermined systems of equations, and maintains them throughout the continued use of the algorithm. Underdetermined systems are unsolvable (secure); the type created by Qwyit is such that there is:
  a large space of incorrect answers;
  a possible small set of working answers that will produce an outcome that is correct only once (configuration and key size dependent—not all configurations and key values will produce a set); and
  a single correct answer.

With recommended symmetric key sizes of greater than at least 256-bits, Qwyit provides strong protection against brute-force attacks. Analysis of any particular Qwyit implementation should be performed against the expected attack scenarios for that particular implementation.

Initial Key Distribution

The Qwyit Directory Service configuration of the reference Qwyit protocol provided in this paper relies on secure initial distribution of authentic tokens, and then the protocol and stream cipher maintain that authenticity and deliver strong data security to the communications through direct mathematic association. Should any other initial distribution mechanisms or processes be deemed necessary to provide 'better' starting security, then simple implementation of that requirement should be done—hand deliver, provide embedded in hardware, etc. There are many well-known techniques with established risk-reward profiles; Qwyit recommends using them where necessary to compliment or replace the reference hard-math distribution outlined in this guide and as noted above.

Authentication

Qwyit authentication is provided through the mathematical generation (hence connection) between the original authentic token and any subsequent child encryption or update key. The impossibility of arriving at a child message key through any means other than direct underdetermined use of the original authentication token is the basis of authentic use; e.g., every 'inspection' (child key use) of ciphertext/plaintext encryption provides implied presentation of the original token. Unlike current authentication that relies on 'cryptographically secure' random number generation and subsequent 'encapsulating' of that child key with an authentic original token, Qwyit uses a direct mathematic derivation of the subsequent keys from the authentic original token; which is provided infrequently through cryptographically secure (P)RNGs where the ability to centrally secure their creation and use is exponentially simpler than distributed need/use of random child keys. Use of the original token is required and its security is maintained through one-way derivation and 'implied' arrival (it is never actually sent or exposed throughout any communications).

Data Security

Qwyit data security is reliant on the underlying cipher's properties for data integrity and security. Since Qwyit can pass its uniquely derived message key to any cipher, if any particular cipher is shown to be weak in any of the standard cryptanalytic attacks (or any other claimed property), it should be abandoned. The reference case Qwyit configuration using the Qwyit stream cipher does not provide data integrity, since this property isn't necessary in a real-world 'fully secure' network (e.g., it isn't a property of open systems, leaving only nuisance attacks (non-meaningful to the content), and it is the same with fully closed systems. The need vs. processing time, from a network perspective, is unwarranted—but hashing integrity can certainly be added if (needlessly) desired).

The Qwyit stream cipher provides strong data security based on Shannon Security, with child message key creation having the properties of OTP keys. Uniquely, the Qwyit stream cipher uses known random numbers as its seed and will maintain the known keys' random properties throughout long-term use in chaining unknown derivatives; e.g., there is no need for seeds to be "cryptographically secure", only that the original authentication token base remains secure and unknown.

Reference Case Analysis

The following are the simple assumptions for a secure Qwyit exchange:

Initial Qwyit credentials securely distributed—the methodology for DS distribution presented in this document can be altered to meet any security threats—for analysis, initial distribution is assumed to be secure; and Secure switch (DS) and local storage of Qwyit credentials (e.g., nothing in any mechanism for the secure handling of Qwyit credentials is used to weaken an exchange).

Security Summary

Qwyit is a one-pass secure message envelope protocol with a reference configuration that provides continuous mutual authentication and secure data communications. Its strength is based on underdetermined equation sets and is designed for use in conjunction with other security processes and policies that protect the system components such that Qwyit's protocol assumptions remain valid. Within the context of its valid assumptions, Qwyit will deliver the properties stated herein.

QwyitTalk™ Security Notes

Some Qwyit Talk (QT) security aspects:

Qwyit Talk keys should be securely stored (either as noted above or using 'best practice' techniques). Knowledge of QT keys cannot be gained from the system in action; as all messages are inherently incorruptible (recipients instantly recognize message corruption) and their content is all numeric key values. The only exception are the P2P messages where the upper level SMK is one-way gate protected from the system-derived SSK, as well as one-way gate protected from the individual child message keys used in the Qwyit™ cipher on the content.

Active stolen/lost key use is invalid on any previous messages (PFS provided by NIL communication key updates'), and implementing PIN storage tying user to keys, along with system lockouts and 'best practice' Alert systems will thwart any active use. Any particular implementations will be determined by each client-connected app.

The inactive 'Listener' problem still exists: someone steals your QT keys, and doesn't use them actively, they just listen and capture all of your messaging. In TLS, this is akin to someone stealing the Private Key, which is actually another reason QT™ is superior: in TLS, this enables reading every message by every participant relying on that Trust node! In QT™, this is just you. And while short PINs are effective in thwarting active use, they are of no value against The Listener. This insidious attack is easily thwarted by injecting a unique P2P key obtained/shared outside of QT™. This key would be used in the message content encryption step during a QTQS creation. If this type of attack is deemed substantial, it should/will be added as an input value in those QT™ client-connected apps that require it.

QT keys are unimportant; i.e., they are not to be used (as designed in the public QT system) as a system-specific verifiable authentication/trust instrument. Qwyit is of the opinion (as yet unrefuted!) that there are no global communication systems in which one is allowed to join without first being authenticated. As such, wherever QT is enabled through client apps, those clients will eventually, most notably at the point of any commerce exchange, be authenticated within the system holding their value. Phone systems bill their users, eCommerce platforms exchange goods for credit through banks requiring their authentic token (credit card, etc.), etc.

QT keys are authentic to the requestor, authentic throughout their use in the QT message hierarchy, and authentic in P2P and group client communications. A QT system (Public and/or Private) can certainly be built in which the QT key is the network authentication token; but the public system does not offer that accountability.

Order of magnitude efficiency—QT messaging hierarchy and exchanges can perform within real-world margins for normal communications. i.e., QT secure messages won't take any longer than insecure messages within their communications network. No other security system in the world can make, and validate, this claim.

This is the only reason existing security techniques have not proliferated where they should—they simply require too much 'system energy' (computing power, time, number of messages, message lengths and content, etc.). This property is the only way any security system will ever allow full global proliferation.

In hardware implementations, QT can be configured (gates sizes, etc.) to operate within the performance characteristics of open-system data handling. QT-on-a-chip can be modeled to perform its simple register-based Mods at almost the same speed as moving open data through a chip—certainly within the specs of any communication standard for open data.

Security is based on mathematic principle, not theory. QT is an unsolvable, underdetermined system of equations—in any single instance and in total of all messaging. Initial key distribution security is based on HTTPS and multi-band delivery, and is certainly customizable to meet any perceived need/improvement. Keys are 'non-critical', therefore most likely HTTPS is sufficient for initial distribution.

QT provides all of the same security properties of TLS (privacy, reliability, authentication, data security, Perfect Forward Secrecy (PFS), etc.).

QT keys

Sizes can be system-specifically modelled. QT primitives are based on any key length of even-numbered bits, with minimal extension of 1 byte (as time passes and computing power increases, QT keys can simply expand to meet the computational security requirements). Control hierarchies can be included. QT keys can actually include Access Control within them, not effecting computation. QT Keys allow for simple, secure storage techniques (PIN-related offsets, etc. for man-to-machine connectivity without the need for difficult passphrase implementations. QT Keys limit bandwidth requirements (storage, transmission, etc.) to well-defined, easily implemented definitions within any communication specification requirements standards.

Figure 6:
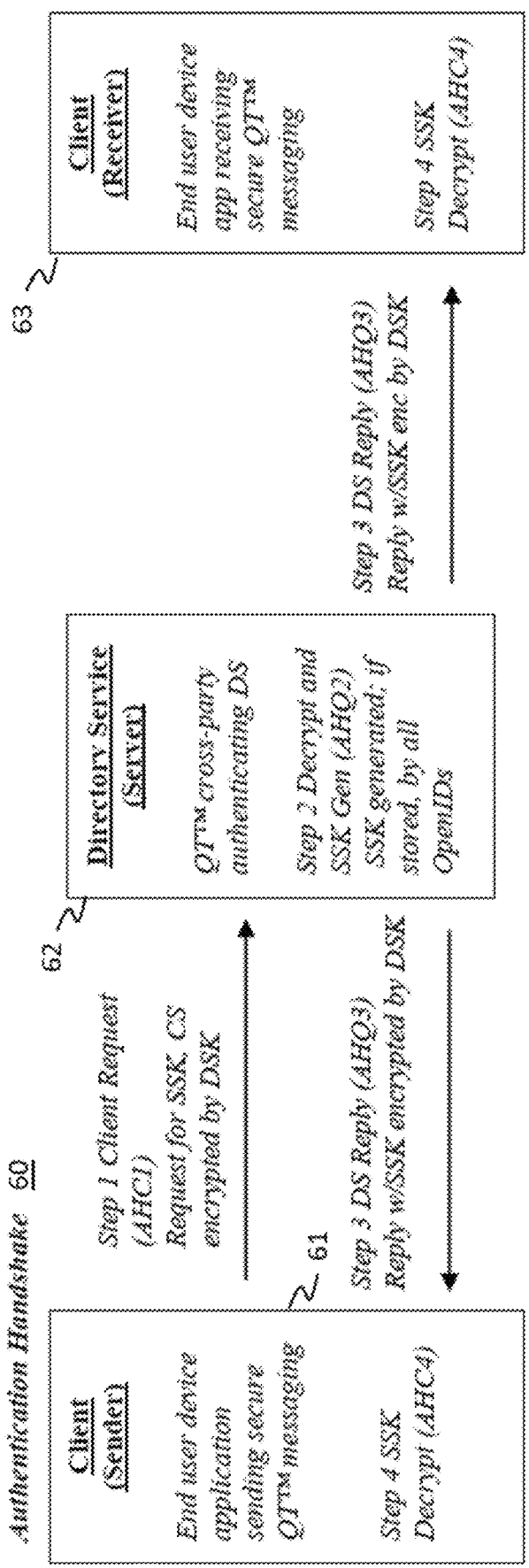
FIG. 6 depicts an exemplary embodiment of an authenticated handshake of the present invention in a group text scenario according to still another aspect of the present invention.

QwyitTalk™ Group Messaging (60, FIG. 6)

Per Message Token/Credential Distribution (Authentication Handshake—AH)

For various group communication scenarios, the sender 61 will initiate a private real-time Authentication Handshake (AH) 60 with a shared QwyitTalk™ Directory Server 62 in order to create a QwyitTalk™ VPN tunnel with multiple intended receivers 63 (based on their OpenIDs). Changes to the above already defined AH steps, as demonstrated below, can be put in place. The difference is in the reply to the requestor (Client Sender 61), and any intended Client Receivers 63. The basic principle of group messaging, along with maintaining the division between the QDS's SSK and the now-group SMK, requires a distribution QTQS send to all members of the group. Any and all group messaging scenarios (timing, add/drop members, etc.) will be handled by the client application connecting to and using the public QT™ QDS 62. Including, but not limited to, storing the SSK locally, SMK (through QR distribution) management, etc. If there is a continual need for group messaging, a local, private QwyitTalk™ system, in which group-member management functionality can be integrated into the QDS, should be considered.

The Public QT™ QDS is envisioned to manage universal connectivity through either the above P2P AHQ3 encapsulated reply, or the below, multi-client AHQ3 reply (these additional group member replies could also be stored in the QDS 62 and retrieved by the Clients, 61, 63 as managed by the client application—this will require a new universal definition of that type of request by the group members.

NOTE: The special kind of 'group' messaging of "1-1 simultaneously" (for a large website, such as Amazon, etc.) requires a simple 'reversal' of the P2P messaging architecture already presented. Instead of the originating Client1 beginning the AH with the QT™ QDS, Client1 sends a communication request to the web destination, openly.

Referring to FIG. 6, Client Sender 61 sends Authorization Request to Website 62 (Step 0, AHC0).

Send Authorization Request to Website 62 in order to receive an SSK for communication. Send AHC0: SenderOpenID, ReceiverOpenID to Website

[AHC0: SenderOpenID, ReceiverOpenID] where ReceiverOpenID is the general, OpenID of the site.

Now the website 62 performs a complete AH 60 with the QT™ QDS, using the webserver's OpenID/DSK relationship. This allows any large website to manage QT™ QDS connectivity in concert w/their methods used to manage connectivity traffic across multiple servers using their single IP address, i.e., each webserver can have a unique OpenID/DSK (recommended), or they can store a single DSK and share/manage it to each server/connection (not recommended), etc.

The webserver 62 then sends an AHC1 to the QT™ QDS, asking to talk P2P securely w/Client1 using their OpenID. The AHQ3 reply will contain the wrapped SSK-encrypted for that Client1 61, as well as returning the SSK-encrypted w/that unique server's DSK relationship. Then the QTQS from webserver to Client1 61 creates a unique SMK from the shared SSK; and then the remainder of Client1's web session continues QT™ secure messaging. This 'reversal' would be made 'standard' in applications that exclusively require this type of connectivity—web browsers and servers, etc. The only possible change in the Public QT™ QDS, as well as managed by these types of applications, is the DSK PDAF key update cycle and timing. It may well be best to have single-stream AH processing per server in order to manage updates sequentially for each use; or some other suggested/managed solution.

Details

As above, except as noted in the AHQ1 request, and AHQ3 reply (now multiplied):

Client Sender 61 sends Authorization Request to Directory Service/Server 62 (Step 1, AHC1). As above, except there is a list of ReceiverOpenIDs. Send AHC1: SenderOpenID, Receiver1OpenID, Receiver2OpenID . . . , CS encrypted in The Qwyit™ Cipher using DSK to DS

[AHC1: SenderOpenID, Receiver1OpenID, Receiver2OpenID, . . . OR, CT] where CT is the encrypted CS.

NOTE: The QT™ QDS will be prepared to test each input, recognizing that the 3rd [and any succeeding] are shorter than the OR, and will know this is a group-request. And will act accordingly for Step 3.

Directory Service/Server 62 reply to Clients 61, 63 (Step 3, AHQ3).

Send SSK Accept (AHQ3) to Sender 61 and Receiver Clients 63. Send AHQ3: OpenID, SSK encrypted in QwyitTalk™ Cipher using DSK to Clients 61, 63. The AHQ3 is sent to the sending and all receiving Clients 63, and DS is authentic if using the correct DSK. If Receiver Client 63 does not exist in DS:

If this DS is part of a federated group, check with other DS members as per the QT™ communication key exchange framework of the group.

Notify Sending Client 61 of situation (if desired/required—no Receiver client).

[AHQ3: OpenID, OR, CT] where OpenID is the Sender and the Receivers in their respective messages, and CT is the ciphertext of the SSK.

Messaging—QwyitTalk

Group messaging requires the Client 61 to send QTQS to each member in their list (that was sent in the AHC1). Each receiving member 63 of the group will recognize the QTQS as a group send (The SMK (SQK, SEK) must be handled and stored securely, only for this particular session.)

Details

As above, except as noted in QTQS, and its receipt by group members.

Figure 7:
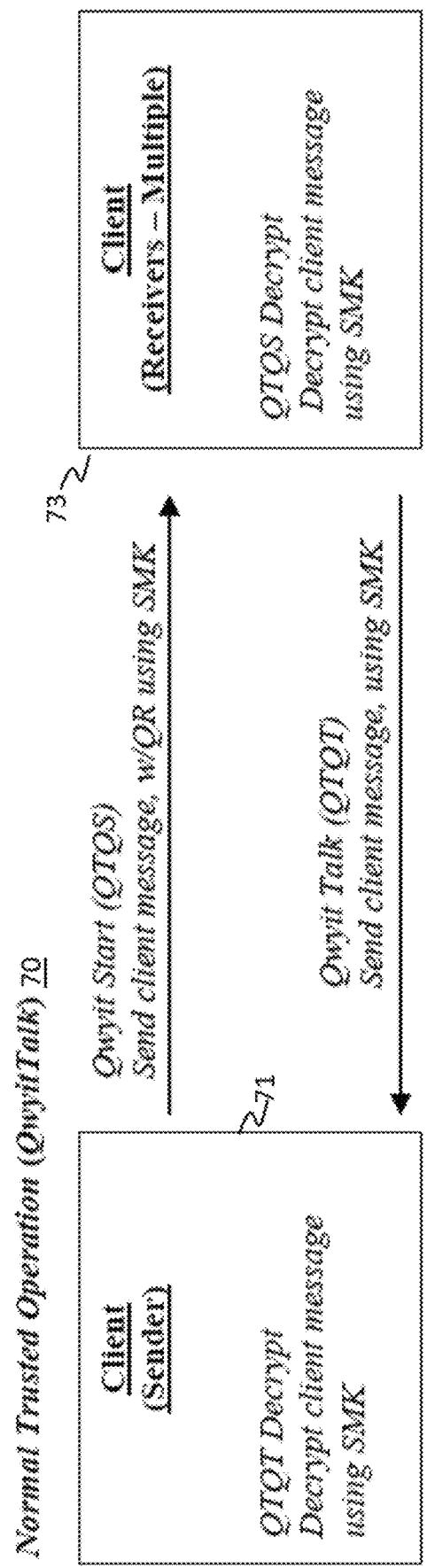
FIG. 7 depicts an exemplary embodiment of a normal trusted operation of the present invention in the group text scenario of FIG. 6 according to yet another aspect of the present invention.

Normal Trusted Operation (70, Shown in FIG. 7).

Sending Client 71 sends QwyitTalk™ Start to Client Receivers 73 (QwyitTalk™ Start, QTQS).

Send QwyitTalk™ Start (QTQS) message.

Send QTQS: OpenID, QR, OR, Optionally: Ciphertext of IMSG.

[QTQS: OpenID, QR, OR, (CT)] where CT is an optional ciphertext of a PT intended for the group—if no such message is intended/necessary, there is no CT included]. NOTE: The receiving clients 73 (managed by their client app), will recognize a QTQS message with only 3 or 4 data elements as being a group QTQS, as opposed to the 6 elements of a P2P QTQS, and will handle accordingly— performing only a single decrypt of any optional CT—they will all create the SMK from the QR.

Receiving Client 73 Decrypts QTQS (QwyitTalk™ Talk, QTQS)

Receiver Client 73, using the AH SSK received from the QDS for this communication:

Determines SMK from the QS message by performing the same MOD16(SSK, QR). Decrypts any optionally sent CT using the just created SMK. Commences Normal Trusted Operation message Receive decryption using SMK in QwyitTalk™ Cipher on OR, Ciphertext— from/to any members of the group.

Management of the SMK key life will be a consideration of the Client Application performing group messaging—updates may be performed in the normal QT™ manner (PDAF PFS NIL communication SMK key updates).

QwyitTalk™ VSU, AH and Messaging Example

The following are an example of the process flow for the complete QT™ system.

QT™ VSU Example

The VSU involves any Client who wants to join the QT™ secure messaging system, contacting the Qwyit Directory Server (QDS). This process is most likely found, performed and managed within a Client Application participating in the QT™ community. The Client and QDS process steps, and output, are as follows:

Client1

I just contacted the Qwyit.com QDS to begin a VSU and join the Qwyit Community!

QDS

I just received a VSU start from Client1 (who submitted a Qwyit.com website form) First, I'll create a new ID for this Client1. The Client1 ID is: 71A2913C34ED7413. Click Continue in Client1 . . . .

Next, I'll create some new keys for this Client1.

The Client1 MQK is: 7F3FB0566CA68F6264E8D990DE5CE9399DEFAE-32395E1D13C82FEDEE35C4FFF9.

The Client1 EOK is: C0BCEBE8CB26B8FA.

The Client1 SOK is: B7D4DD28 Click Continue in Client1 . . . .

Next, I'll form the MOK and MEK using the PDAF on the EOK and MQK for this Client1.

The Client1 MOK is: 7B789794ABE2DEF642B7A90876D613A5B66EC64-3A74160BC6B729994498237D0.

The Client1 MEK is: DED71FBEE58CDD9BF1146299678A16C7A0712F-10218B0ED2A7EDD65D24B36F70.

Click Continue in Client1 . . . .

Now, I'll ready the keys for securely sending to this Client1.

The Client1 EOK II SOK is: C0BCEBE8CB26B8FAB7D4DD28.

The Client1 EOK II SOK encrypted is: 3FEB9B3E27CC375C1BBCA6B8.

Now, the keys are secured and ready to send in email and SMS to this Client1.

The Client1 EOK encrypted (EOKe) is: 3FEB9B3E27CC375C.

The Client1 SOK encrypted (SOKe) is: 1BBCA6B8 Click Continue in Client1 . . . .

Lastly, the keys are sent in HTTPS (MQK), email (EOKe) and SMS (SOKe) to this Client1.

[VSQ2: 71A2913C34ED7413, 7F3FB0566CA68F6264E8D990DE5CE9399DEFAE3-2395E1D13C82FEDEE35C4FFF9] sent in HTTPS to this Client1.

[VSQ3: 71A2913C34ED7413, 3FEB9B3E27CC375C] sent in email to this Client1.

[VSQ4: 71A2913C34ED7413, 1BBCA6B8] sent in SMS to this Client1.

VSU processing now switches to Client1 Click Continue in Client1 . . . .

Client1

VSU processing now continues here in Client1.

First, all three values from the HTTPS browser window, an email and a text msg SMS will be cut & pasted into the Client1 Qwyit application and stored.

The Client1 EOKe II SOKe is: 3FEB9B3E27CC375C1BBCA6B8.

The Client1 EOK II SOK decrypted is: C0BCEBE8CB26B8FAB7D4DD28 Click Continue in Client1 . . . .

The Client1 MOK is: 7B789794ABE2DEF642B7A90876D613A5B66-EC643A74160BC6B729994498237D0.

The Client1 MEK is: DED71FBEE58CDD9BF1146299678A16C7A-0712F10218B0ED2A7EDD65D24B36F70.

Now all the master Client1 keys (MQK, MEK) have been decrypted and are stored in Client1 Click Continue in Client1 . . . .

Next, reply with VSC5 message to QDS using the new keys.

First step is to create the Confirmation Salt using the PDAF and the last 128-bits of the MQK and MEK.

The Client1 Confirmation Salt is: 7B3DCB65174CEC050DFCCCDC74FDEC22.

Click Continue in Client1 . . . .

Next, use the QwyitTalk cipher to send the Confirmation Salt in an encrypted VSC5 message back to the QDS.

The Client1 VAC5 message key is: 3339537D8F09106BCC4B5DCC1B3DCAF8A0A197-7099FA4507DA6FD79E19370835.

The Client1 VAC5 ciphertext is: j{†±ÂKF•ýr•Ppú-ÐåÝ³Ü=%J"Ò^^z:g.

Click Continue in Client1 . . . .

Now send the encrypted VSC5 confirmation message back to the QDS.

[VSC5: 71A2913C34ED7413, DBADC51DEC597FCB536F68315F4D63AFE7A1-69939B7F0849A5ECE330D77382B2, j{†±ÂKF•ýr•Ppú-ÐǎÝ³Ü=%J"Ò˜˜z:g] sent using Port 4180 to the QDS.

VSU confirmation processing now switches to the QDS Click Continue in Client1 . . . .

QDS

VSU processing now continues here in QD.

First step is to create the Confirmation Salt using the PDAF and the last 128-bits of the MQK and MEK.

The Client1 Confirmation Salt is: 7B3DCB65174CEC050DFCCCDC74FDEC22.

Click Continue in Client1 . . . .

Next, use the QwyitTalk cipher to decrypt the received Confirmation Salt from the VSC5 message.

The Client1 VAC5 received message key is: 3339537D8F09106BCC4B5DCC1B3DCAF8A0A197-7099FA4507DA6FD79E19370835.

The Client1 VAC5 received plaintext, which is the Confirmation Salt, is: 7B3DCB65174CEC050DFCCCDC74FDEC22.

Click Continue in Client1 . . . .

Now compare the received with the computed . . . .

As you can see, they are the same. Client1 information is stored here in the QDS, and is now a Qwyit Community member! VSU PROCESSING COMPLETE!

Client1

VSU PROCESSING COMPLETE!

QT™ AH Example

The AH involves any Client who wants to securely message with any other QT™ secure messaging system Client(s). In this example, the 'app' is configured to perform P2P secure messaging where Client1 contacts the Qwyit Directory Server (QDS) and receives an encrypted SSK, as well as a wrapped encrypted SSK for their intended recipient, Client2. This process is performed without any end-user participation, simply as the start of their messaging to Client2. The Client1, QDS and Client2 process steps, and output, are as follows:

Client1

I am going to message Client2. First, I need to perform an AH with the QDS in order to get a shared start key for use with Client2.

Here is my current Client1 MQK: 554E3EE1B25DC81611E3A3FE76EF63D561BA19B1-489901FCD07B1899B03C44F0.

Here is my current Client1 MEK: A6DB598412DDF19E16160728B19E2788BDB88EFE7-B05A0DCE88B6651E6220FFF.

First, I'll calculate my CS to associate with this AH Click. Continue in Client1 . . . .

The CS associated with this AH is 27989956E84BC7EB.

Now, I'll send the AHC1 to the QDS with the OpenID of Client2 I need to get an OpenReturn in order to encrypt my AHC1.

OpenReturn=55E51600B8EF22340D7C0FB277D19-27D738796688747DD965421A9D5A255B858.

The Client2 OpenID is A67241A3186F6CCD.

Click Continue in Client1 . . . .

The AHC1 message key is: A4395EB99CDEF81A81D07DD2CBBAD98C45C3699-8B98F8F66040FAB4B04EFACE5.

The AHC1 ciphertext is: 73030A010C7C770F7C7B7007050F7403.

[AHC1: 0123456789ABCDEF, A67241A3186F6CCD, 55E51600B8EF22340D7C0FB277D1927D7387966887-47DD965421A9 D5A255B858, 73030A010C7C770F7C7B7007050F7403] sent using Port 4180 to the QDS.

AHC1 processing now switches to the QDS.

Click Continue in Client1 . . . .

QDS

AHC1 processing now continues here in QDS.

First step is to decrypt the received AHC1 using Qwyit-Talk cipher and the keys associated with the sending Client, in this case, Client1.

The Client1 AHC1 received message key is: A4395EB99CDEF81A81D07DD2CBBAD98C45C369-98B98F8F66040FAB4B04EFACE5.

The Client1 AHC1 received plaintext, which is the CS, is: 27989956E84BC7EB.

Click Continue in Client1 . . . .

Check that the Calc CS equals the sent, decrypted CS (not done here, but would be) Check that the Client2 exists as a Qwyit member.

Keys retrieved and shown in Client 2 . . . .

When this is true, create a Session Start Key (SSK) for this pair of Qwyit members to communicate.

The Client1-Client2 SSK is: 934FFCFFE84B2A99068A16F5BF251F94349AC6A-2887647A120CE0DEC5196DDE 1F29A1EFB8C54309716F6641C9D91F3283BEEC911-4E94EB7144C21FBEBEB73471

Click Continue in Client1 . . . .

Now, I'll send out the AHQ3 to just Client1 with Client2's wrapped SSK I need to get an OpenReturn in order to encrypt the AHQ3 for Client1.

OpenReturn=4DA1A27A59137E39562917FFE4A67-7EADED42D0305FDDF86A8E2D58ACA74B03B.

Click Continue in Client1 . . . .

Only AHQ3 is to Client1 . . . .

The AHQ3 Client1 message key is: 4D94ADE3BB2B35D47B28F3ECB8DED39FD67373-B964A3BF6F683FEEDB68B3ED1A.

The AHQ3 first ciphertext is: 0D770D7207070375077A060001747D0D07740A79770-50376007E76707575007277020E7274 05030B0E0C76057671777704087003750101010310397B0-5010074707276007570010371A0107 7600057D030674740E700774007B7C7D7402000B7E7-7747276740A73080271780707040170 20C707474030607747D0000476700670.

The AHQ3 Client2 message key is: AE088ECDB215E3727E058172A7096BC6DEE63399-9D141BEA7E437BD7869AA9DC.

The AHQ3 second ciphertext is: 7876047E7E060502070A057777720E0B07730874090-771070371020C07047A0277717C77700 5780B017C06020575047005757776070601740D07007-7057D0172077709709000050 67A710 40176030E05067376030E05067178730908707171 0E7-7070073700A08080D010800740072700 3717701060406727A737B76720D7372

[AHQ3: 0123456789ABCDEF, 4DA1A27A59137E39562917FFE4A677EADED42D030-5FDDF86A8E2D58ACA74B03B, 0D770D7207070375077A060001747D0D07740A7977-050376007E767075750072770 20E727405030B0E0C76057671777704087003750 1010-103097B05010074707276007570010 37 17A01077600057D030674740E700774007B7C7D740-2000B7E77747276740A7308027178070 7040177020C707474030607747D0000476700670,

7876047E7E060502070A057777720E0B0773
08740907710703710 20C07047A0277717C777005780B-
017C06020575047005757776 07060174
0D070077057D01720777 0979090005067A7104017603-
0E05067376030E050671787309087071
710E77070073700A08080D0108007400727003717701-
060406727A737B76720D7372] sent using Port 4180 to Client1

AHQ3 processing now switches to Client1 and Client2
Click Continue in Client1 . . . .
Client1
Client1 now decrypts their section of the AHQ3 using QwyitTalk to get the SSK for their session.
The Client1 AHQ3 received message key is:
4D94ADE3BB2B35D47B28F3ECB8DED39FD67373B-964A3BF6F683FEEDB68B3ED1A.
The Client1 AHQ3 received plaintext, which is the SSK, is:
934FFCFFFE84B2A99068A16F5BF251F94349AC6A28-87647A120CE0DEC5196DDE1F29A1
EFB8C54309716F6641C9D91F3283BEEC9114E94EB-7144C21FBEBEB73471.
Click Continue in Client1 . . . .
After sending (the QDS), and receiving (Client1), both perform a PDAF PFS NIL communication DSK key update. This is accomplished using the MQK and MEK in a PDAF. Optionally, for a 1,024-bit length, and then performing an OWC to pare to 512-bits.
Here is the PDAF result for Client1 new MQK/MEK keys:
2054844D0EC32E83F881D65485F8BCE96DAA2A4-4A10299030D33BDCD9C57B8C
06175F0FF98ABBF97B471290DF0C78CE1D7E7B-014A4190BD302CB05CD
C652C3551DA2FFFF2733C99FCBFD988E9299F745E-5189D26CB1A40EEB24B05785D4314
A01627CBCC73843160740C6195883F0176E28B6E2B-1F38A31F
C146F089D0E81950EB1E14112C3B02B710750042FB-B2EOB653C2714E45851C841BF791D
ED838095D36D789882138AD240F4488EC7FC6B7CD-6626A897D
CB624C4100CE6DE87E7A822A6631411FC0227BE78-EC99D49077CFCE4D9C1CCF5D4924
230B5C96CD93E1F27933B2D4DD4C5A3676F76D40-45F017F13C
11A3525F5DC04F9DAB5B9567EC16A7E2F.
Here is OWC final result for Client1 new MQK key:
29C1EF0B7939D77734CE1B930E96124684F82682B-39CCFAE521E5983EB19BE86.
Here is OWC final result for Client1 new MEK key:
C450C425656D73B26D841B630526109CEF111DD5D-144164DB874948704B5D051.
The AH is Complete! Now Client1 and 2 can message securely . . . Lastly, the QDS performs the NIL communication key update . . . .
Click Continue in Client1 . . . .
QDS
I perform the exact same PFS key updates for Client1
Here is the PDAF result for Client1 new MQK/MEK keys:
2054844D0EC32E83F881D65485F8BCE96DAA2A4-A10299030D33BDCD9C57B8C
06175F0FF98ABBF97B471290DF0C78CE1D7E7B014-A4190BD302CB05CD
C652C3551DA2FFFF2733C99FCBFD988E9299F745E-5189D26CB 1A40EEB24B05785D4314
A01627CBCC73843160740C6195883F0176E28B6E2B-1F38A31F
C146F089D0E81950EB1E14112C3B02B710750042FB-B2EOB653C2714E45851C841BF791D
ED838095D36D789882138AD240F4488EC7FC6B7CD-6626A897D
CB624C4100CE6DE87E7A822A6631411FC0227BE78-EC99D49077CFCE4D9C1CCF5D4924
230B5C96CD93E1F27933B2D4DD4C5A3676F76D404-5F017F13C 11A3525F5DC04F9DAB5B9567EC16A7E2F
Here is OWC final result for Client1 new MQK key:
29C1EF0B7939D77734CE1B930E96124684F82682B3-9CCFAE521E5983EB19BE86.
Here is OWC final result for Client1 new MEK key:
C450C425656D73B26D841B630526109CEF111DD5D-144164DB874948704B5D051
The AH is Complete! Now Client1 and 2 can message securely and I am Finished! . . . .
Click Continue in Client1 . . . .
Client2
These are for informational purposes—Client2 is not a participant in the routine AH
Here are the retrieved Client2 MQK:
46594234B75B9DAA00E0DD6A3563870ABCA7A0-2BEE5D767150EEB97CBF8363EF.
Here are the retrieved Client2 MEK:
41B1D16C88CAE1010168B2CB74875AD1F79C51665-60AA7C208BEBF243BAF12F2.
The AH is Complete! Now Client1 and 2 can message securely . . . .
Next, Client 1 performs the NIL communication key update . . . .
Click Continue in Client1 . . . .
QT™ Messaging Example (continuing from the AH . . . )
Client1
Now I am going to talk to Client2 in our application . . . .
First, I'll create a Qwyit Return (QR) value QR is:
21FBFCFE73E926F4FF0E7F193C49EFA7410D2D-DF28BEFAE92B47E81576A272C
9B561F30467E4C36A6A34E80981567263EBCA53C-59D2D759F1974641DB8D3D6DD.
Click Continue in Client1 . . . .
Next, I'll use the SSK from the QDS and the just created QR to create a Session Master Key (SMK, in 2 halves, SQK and SEK).
New Client1-Client2 SQK is: B43AE8ED5B24408DF588850EEB6EFE3B7597E371-A024318A4B05E5F1C7384FAA.
New Client1-Client2 SEK is:
A7FB01FFE338F3F1702A4C151EE7658B16A81CD6-DBB150005D3673CB668A0A4E.
Click Continue in Client1 . . . .
Now ready the message, which will be: Now is the time for all good men to come to the aid of the party. Then, encrypt it using QwyitTalk . . . .
OpenReturn for this message is:
7969F5F110C59D7521FDC1C59B10BD8F97D96A097-3DECEODCD5DB0C1E596FD0D.
The QTQS message key is:
7C4BC934713CEDA7495E45AC98DABD1E81CC998-08DAAE2CFDC0BEC7B3EBAAB73.
QwyitTalk Qwyit Start (QTQS) is:
0123456789ABCDEF,
21FBFCFE73E926F4FF0E7F193C49EFA7410D2DDF- 28BEFAE92B47E81576A272C9B561F3
0467E4C36A6A34E80981567263EBCA53C59D2D75-
9F1974641DB8D3D6DD,
7969F5F110C59D7521FDC1C59B100BD8F97D96A097-
3DECEODCD5DB0C1E596FD0D,
4DA1A27A59137E39562917FFE4A677EADED42D03-
05FDDF86A8E2D58ACA74B03B,7876
047E7E060502070A057777720EOB0773087409077107-
0371020C07047A0277717C777005780
B017C0602057504700575776070601740D070077057-
D01720777079090005067A71040176
030E05067376030E05067178730908707170E770700-
73700A08080D01080074007270037177
01060406727A737B76720D7372,
792C43622A4A13405F5413372C29241752564765555-
92D63
5E572B256229542B18452C635A56555518302E61315-
A2666252A54622A2517365B20623120 30434A.

Now, QT processing continues in Client 2 . . . Click Continue in Client1 . . . .

Client2

I've just received a QTQS message from Client1 . . . I'll process it! First, I need to unwrap the SSK . . . .

The Client2 AHQ3 received message key is: AE088ECDB215E3727E058172A7096BC6DEE633999-D141BEA7E437BD7869AA9DC.

The Client2 AHQ3 received plaintext, which is the SSK, is:
934FFCFFE84B2A99068A16F5BF251F94349AC6A28-87647A12CE0DEC5196DDE1F29A1
EFB8C54309716F6641C9D91F3283BEEC9114E94EB-7144C21FBEBEB73471.

Next, I need to unwrap the SMK . . . .

Now, take the just received QR and create the SMK for this message.

New Client1-Client2 SQK is: B43AE8ED5B24408DF588850EEB6EFE3B7597E371-A024318A4B05E5F1C7384FAA.

New Client1-Client2 SEK is: A7FB01FFE338F3F1702A4C151EE7658B16A81CD-6DBB150005D3673CB668A0A4E.

Click Continue in Client1 . . . .

The QTQS message key is: 7C4BC934713CEDA7495E45AC98DABD1E81CC99-808DAAE2CFDC0BEC7B3EBAAB73.

QTQS plaintext message is: Now is the time for all good men to come to the aid of the party.

Now I'll reply back to Client1 . . . message is: Why won't anyone throw me a party with cupcake for my birthday? Click Continue in Client1 . . . .

OpenReturn for this message is: 9D1A5E78202F95449BBE8EFF5C8925A370FDE77-CA6318C852E176AE50C8FE4E8.

The QTQT message key is: 5E6727967FD25485F855B7B8814BAFF011B88E1B1-65BAB81F2B7DB7DD075BA4D.

QwyitTalk Qwyit Talk (QTQT) is A67241A3186F6CCD, 9D1A5E78202F95449BBE8EFF5C8925A370FDE77C-A6318C852E176AE50C8FE4E8,
622D4F17455857114366255C4C5B5650664C5D-472D4062555D1155623127344481135514C
2D112144461521202295D11205D3017293B
17262D42435D26204D7B.

Now, QT processing continues in Client 1 . . . .
Click Continue in Client1 . . . .

Client1

I've just received a QTQT message from Client2 . . . .

I'll process it using our shared SMK keys and the sent Open Return!

The QTQT message key is: 5E6727967FD25485F855B7B8814BAFF011B88E1-B165BAB81F2B7DB7DD075BA4D.

QTQT plaintext message from Client 2 is: Why won't anyone throw me a party with cupcake for my birthday?

Click Continue in Client1 . . . .

After sending and receiving and the SMK key life is reached, both Clients perform a PDAF PFS NIL communication DSK key update.

This is accomplished using the SQK and SEK in a PDAF. Optionally, for a 1,024-bit length, and then performing an OWC to pare to 512-bits.

First, here in Client 1 . . . .

Click Continue in Client1 . . . .

Here is the PDAF result for Client1 new SQK/SEK keys:
FFB765EB3BAC35B2DDDB3EEC4565654F0FAA53-599515392E35F82C9B62D63442F6B9C
DCB33F92835AD83ECB1CB8CDCDEE518F8CBBF3-C8BC5561DD
8DF7B15EA87B8BFB3C8081478F55D6F6369DDA12-13C573F816561EE153A0FC98D790A
BDE12938823A93BA72F8D5DA6D78E5CF956553A9-D1E88C1C988C8FBE7489DFF13F38F84329C4B30A-2B512E5316CF31E7F0F75E84B0231D75F21D8753F-94CE650A8372AC120C
CC43AF90FDD3EFB6E79CE8986F869224E623A446-6FC98F2F46AF8C7FF2011F28DB33A
ADE6B23663F35530EFE461DE71FAFE869FFD983-401FAC45ECE75233EA20C08372BEBB
A07BF5BC35A010BB7F7CFAF69412A67B39F98013-A4582CCF.

Here is OWC final result for Client1 new SQK key: E2B9E68DA81A9BB3F48EE6C087E48376549768A8-7BAC749B3977AF31BE5C268F.

Here is OWC final result for Client1 new SEK key: 10A864B15C288EDAE5096FE6B4069A57682CB996-A2478A166395D302C884EDEB.

Now, update the SMK in Client 2 . . . .

Click Continue in Client1 . . . .

Client2

Here is the PDAF result for Client2 new SQK/SEK keys:
FFB765EB3BAC35B2DDDB3EEC4565654F0FAA535-99515392E35F82C9B62D63442F6B9C
DCB33F92835AD83ECB1CB8CDCDEE518F8CBBF3-C8BC5561DD
8DF7B15EA87B8BFB3C8081478F55D6F6369DDA1-213C573F816561EE153A0FC98D790A
BDE12938823A93BA72F8D5DA6D78E5CF956553A-9D1E88C1C988C8FBE7489DFF13F38F84329C4B30-A2B512E5316CF31E7F0F75E84B0231D75F21D875-3F94CE650A8372AC120C
CC43AF90FDD3EFB6E79CE8986F869224E623A446-6FC98F2F46AF8C7FF2011F28DB33A
ADE6B23663F35530EFE461DE71FAFE869FFD9834-01FAC45ECE75233EA20C08372BEBB
A07BF5BC35A010BB7F7CFAF69412A67B39F9801-3A4582CCF.

Here is OWC final result for Client2 new SQK key: E2B9E68DA81A9BB3F48EE6C087E48376549768A-87BAC749B3977AF31BE5C268F.

Here is OWC final result for Client2 new SEK key: 10A864B15C288EDAE5096FE6B4069A57682CB99-6A2478A166395D302C884EDEB.

Click Continue in Client1 . . . .

Client1

This concludes the AH and QwyitTalk demonstration. Thank you!

Client2

This concludes the AH and QwyitTalk demonstration. Thank you!

What is claimed is:

1. A method for transmitting encryption keys to users who are communicating between each other in an encrypted manner using unbreakable encryption comprising:
   sending a verified setup request from a first client to a directory server during an https session, wherein said verified setup request includes at least an email address for the first client and a short message service (SMS) telephone number via which the first client can receive a text message;
   generating, by the directory server upon receipt of the verified setup request from the first client, a first set of encryption credentials for the first client, wherein said first set of encryption credentials includes a first open identification (OpenID), a first master key (MQK), a first email offset key (EOK), and a first SMS offset key (SOK);
   performing by the directory server a position digit algebraic function (PDAF) with the first EOK and the first SOK by cycling through each round of the first SOK moving a starting digit right one digit for each cycle to generate a first master offset key (MOK);
   performing by the directory server the PDAF with the first MQK and the first MOK to generate a first master exchange key (MEK);
   storing the first MQK and the first MEK by the directory server in relation with the first client's email address, first client's SMS telephone number, first OpenID and a first IP address via which the first client initially contacted the directory server;
   encrypting by the directory server the first EOK and the first SOK using the first MQK to generate a first encrypted email offset key (EOKe) and a first encrypted SMS offset key (SOKe), respectively;
   sending a verified setup reply to the first client during the https session, wherein said verified setup reply includes the first OpenID, and the first MQK;
   sending an email reply to the first client to the email address provided by the first client, wherein said email reply includes the first OpenID and the first EOKe;
   sending an SMS text message reply to the first client to the SMS telephone number provided by the first client, wherein said SMS text message reply includes the first OpenID and the first SOKe;
   decrypting by the first client the first EOKe and the first SOKe using the first MQK to generate the first email offset key (EOK) and the first SMS offset key (SOK), respectively;
   performing by the first client the PDAF with the first EOK and the first SOK by cycling through each round of the first SOK moving a starting position right one digit for each cycle to generate the first MOK;
   performing by the first client the PDAF with the first MQK and the first MOK to generate the first MEK; and
   concatenating the first MQK and the first MEK to form a first directory service key (DSK) for the first client.

2. The method according to claim 1, further comprising:
   generating by the first client a first open return, which is a random number;
   performing by the first client a modular addition of the first open return and the first MEK to generate a first return (R);
   performing by the first client a combine function using the first MQK and the first R to generate a first alphabet (A);
   performing by the first client an extract function using the first MQK and the first A resulting in the first message key (W);
   generating by the first client a first confirmation salt (CS) by performing the PDAF with part of the first MQK and an equal part of the first MEK;
   encrypting the first CS using the first W to generate a first encrypted confirmation salt (CSe); and
   sending by the first client a confirmation message to the directory server, which confirmation message includes the first OpenID, the first open return, and the first CSe.

3. The method according to claim 2, further comprising:
   performing by the directory server a modular addition of the first open return and the first MEK to generate the first R;
   performing by the directory server the combine function using the first MQK and the first R to generate the first A;
   performing by the directory server the extract function using the first MQK and the first A resulting in the first W;
   decrypting by the directory server the first CSe using the first W to obtain a first decrypted confirmation salt;
   generating by the directory server a first generated confirmation salt by performing the PDAF with said part of the first MQK and said equal part of the first MEK; and
   comparing by the directory server the first decrypted confirmation salt with the first generated confirmation salt.

4. The method according to claim 1, further comprising:
   generating by the first client a first message identification (MID), which is a random number;
   generating by the first client a first authentication request open return, which is a random number;
   sending an authorization request to the directory server by the first client to receive a session start key (SSK) for communication with a second client, which authorization request includes the first OpenID, the first authentication request open return, and an authentication request cipher text, which authentication request cipher text includes the first OpenID, a second OpenID for the second client, and the MID encrypted with a Qwyit Cipher using the first DSK.

5. The method according to claim 4, further comprising:
   decrypting by the directory server with the Qwyit Cipher the first OpenID, the second OpenID, and the MID using the first DSK and the first authentication request open return;
   verifying by the directory server that the first OpenID in the authentication request matches the decrypted version of the first OpenID; and
   creating the SSK by the directory server.

6. The method according to claim 5, further comprising:
   storing the SSK by the directory server in relation with the first OpenID, the second OpenID and the MID.

7. The method according to claim 5, further comprising:
   generating by the directory server a first SSK accept message open return; and sending by the directory server to the first client a first SSK accept message, which includes the first SSK accept message open return, and a first SSK accept message cipher text, which first SSK accept message cipher text includes the SSK, the first OpenID and the second OpenID encrypted in the Qwyit Cipher using the first DSK and the first SSK accept message open return.

8. The method according to claim 7, further comprising: generating by the directory server a second SSK accept message open return; and sending by the directory server to the second client a second SSK accept message, which includes the second SSK accept message open return, and a second SSK accept message cipher text, which second SSK accept message cipher text includes the SSK, the first OpenID and the second OpenID encrypted in the Qwyit Cipher using the first DSK and the second SSK accept message open return.

9. The message according to claim 7, further comprising: decrypting by the first client with the Qwyit Cipher the first SSK accept message cipher using the first DSK and the first SSK accept message open return to obtain the SSK; and storing the SSK by the first client.

10. The message according to claim 7, further comprising: decrypting by the second client with the Qwyit Cipher the second SSK accept message cipher using the second DSK and the second SSK accept message open return to obtain the SSK; and storing the SSK by the second client.

11. The method according to claim 9, further comprising: performing by the first client a NIL communication DSK update by performing a PDAF on the first MQK and the first MEK for two rounds creating an updated first MQK and an updated first MEK; and performing by the directory server a NIL communication DSK update by performing a PDAF on the first MQK and the first MEK for two rounds creating the updated first MQK and the updated first MEK.

12. The method according to claim 10, further comprising:

performing by the second client a NIL communication DSK update by performing a PDAF on the second MQK and the second MEK for two rounds creating an updated second MQK and an updated second MEK; and performing by the directory server a NIL communication DSK update by performing a PDAF on the second MQK and the second MEK for two rounds creating the updated second MQK and the updated second MEK.

13. The method according to claim 9, further comprising: performing by the first client a NIL communication DSK update by performing a PDAF on the first MQK and the first MEK for four rounds creating a first double length MQK and a first double length MEK;

performing by the first client a one-way-cut of each of the first double length MQK and the first double length MEK to form a first updated MQK and a first updated MEK;

performing by the directory server a NIL communication DSK update by performing a PDAF on the first MQK and the first MEK for four rounds creating the first double length MQK and the first double length MEK; and performing by the directory server a one-way-cut of each of the first double length MQK and the first double length MEK to form the first updated MQK and the first updated MEK.

14. The method according to claim 10, further comprising:

performing by the second client a NIL communication DSK update by performing a PDAF on the second MQK and the second MEK for four rounds creating a second double length MQK and a second double length MEK;

performing by the second client a one-way-cut of each of the second double length MQK and the second double length MEK to form a second updated MQK and a second updated MEK;

performing by the directory server a NIL communication DSK update by performing a PDAF on the second MQK and the second MEK for four rounds creating the second double length MQK and the second double length MEK; and performing by the directory server a one-way-cut of each of the second double length MQK and the second double length MEK to form the second updated MQK and the second updated MEK.

15. The method according to claim 5, further comprising: generating by the directory server a first SSK accept message open return; and sending by the directory server to the first client a first SSK accept message, which includes first OpenID, the first SSK accept message open return, a first SSK accept message cipher text, and a second SSK accept message cipher text, which first SSK accept message cipher text includes the SSK encrypted in the Qwyit Cipher using the first DSK and the first SSK accept message open return, and which second SSK accept message cipher text includes the SSK doubly encrypted in the Qwyit Cipher using the second DSK and the first SSK accept message open return.

16. The method according to claim 15, further comprising:

decrypting by the first client the first SSK accept message cipher text with the Qwyit Cipher using the first DSK and the first SSK accept message open return to obtain the SSK;

generating by the first client a first qwyit open return;

performing by the first client a mod16 operation on the SSK and the first qwyit open return to obtain a session master key (SMK);

generating a second qwyit open return by the first client;

sending by the first client to the second client a Start Message, which includes the first SSK accept message open return, the second SSK accept message cipher text, the first OpenID, the first qwyit return, the second qwyit return, and an initial message cipher text, which is an initial message plain text that has been encrypted with the Qwyit Cipher using the SMK and the second qwyit open return.

17. The method according to claim 16, further comprising:

doubly decrypting the second SSK accept message cipher text by the second client with the Qwyit Cipher using the first SSK accept message open return and the second DSK to derive the SSK;

deriving by the second client the SMK from the derived SSK by performing the mod16 operation on the SSK and the first qwyit open return; and decrypting the initial message cipher text with the Qwyit Cipher using the SMK and the second qwyit open return to obtain the initial message plain text.

18. The method according to claim 1, further comprising:
generating by the first client a first authentication request open return, which is a random number;
generating by the first client a first confirmation salt (CS) by performing the PDAF with part of the first MQK and an equal part of the first MEK;
encrypting the first CS with a Qwyit Cipher using the first authentication request open return and the first DSK to generate a first encrypted confirmation salt (CSe); and
sending an authorization request to the directory server by the first client to receive a session start key (SSK) for communication with a plurality of second clients, which authorization request includes the first OpenID, a plurality of second OpenIDs, the first authentication request open return, and an authentication request cipher text, which authentication request cipher text includes the CSe.

19. The method according to claim 18, further comprising:
decrypting by the directory server with the Qwyit Cipher the CSe using the first DSK and the first authentication request open return;
verifying by the directory server that the first OpenID in the authentication request matches the decrypted version of the first OpenID; and
creating the SSK by the directory server.

20. The method according to claim 19, further comprising:
storing the SSK by the directory server in relation with the first OpenID and the plurality of second OpenIDs;
generating by the directory server a first SSK accept message open return;
sending by the directory server to the first client a first SSK accept message, which includes the first SSK accept message open return, and a first SSK accept message cipher text, which first SSK accept message cipher text includes the SSK encrypted in the Qwyit Cipher using the first DSK and the first SSK accept message open return;
sending by the directory server to each of the plurality of second clients a second SSK accept message, which includes the first SSK accept message open return, and a second SSK accept message cipher text, which second SSK accept message cipher text includes the SSK encrypted in the Qwyit Cipher using each second client's DSK and the first SSK accept message open return;
decrypting by the first client with the Qwyit Cipher the first SSK accept message cipher using the first DSK and the first SSK accept message open return to obtain the SSK;
storing the SSK by the first client;
decrypting by each of the second clients with the Qwyit Cipher the second SSK accept message cipher using each of the second client's DSK and the first SSK accept message open return to obtain the SSK;
storing the SSK by each of the second clients;
generating by the first client a first qwyit open return;
performing by the first client a mod16 operation on the SSK and the first qwyit open return to obtain a session master key (SMK);
generating a second qwyit open return by the first client;
sending by the first client to the each of the second clients a Start Message, which includes the first OpenID, the first qwyit return, the second qwyit return, and an initial message cipher text, which is an initial message plain text that has been encrypted with the Qwyit Cipher using the SMK and the second qwyit open return;
deriving by each of the second clients the SMK from the SSK by performing the mod16 operation on the SSK and the first qwyit open return; and
decrypting the initial message cipher text with the Qwyit Cipher using the SMK and the second qwyit open return to obtain the initial message plain text.

* * * * *